United States Patent
Kofman et al.

(10) Patent No.: US 12,479,351 B2
(45) Date of Patent: Nov. 25, 2025

(54) APPARATUSES, SYSTEMS AND METHODS FOR THE TRANSPORTATION OF WIND TURBINE BLADES ON ROADWAYS

(71) Applicant: Vestas Wind Systems A/S, Aarhus N (DK)

(72) Inventors: Joris Kofman, Aalborg Øst (DK); Ariel de Silvio, Aarhus C (DK); Kurt Jensen, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 471 days.

(21) Appl. No.: 17/795,708

(22) PCT Filed: Feb. 26, 2021

(86) PCT No.: PCT/DK2021/050055
§ 371 (c)(1),
(2) Date: Jul. 27, 2022

(87) PCT Pub. No.: WO2021/175393
PCT Pub. Date: Sep. 10, 2021

(65) Prior Publication Data
US 2023/0090076 A1     Mar. 23, 2023

(30) Foreign Application Priority Data

Mar. 4, 2020   (DK) ............................ PA 2020 70144

(51) Int. Cl.
*F03D 13/40*     (2016.01)
*B60P 3/40*      (2006.01)

(52) U.S. Cl.
CPC ................ *B60P 3/40* (2013.01); *F03D 13/40* (2016.05); *F03D 13/401* (2023.08)

(58) Field of Classification Search
CPC .. B60P 3/40; B60P 3/41; F03D 13/401; F03D 13/402; F03D 13/40
See application file for complete search history.

(56) References Cited

U.S. PATENT DOCUMENTS

| | | | |
|---|---|---|---|
| 1,996,695 A | 4/1935 | Bigley, Jr. | |
| 4,762,192 A * | 8/1988 | Maxwell | B62D 59/04 180/14.2 |
| 2014/0369779 A1 * | 12/2014 | Randall | B60P 3/40 410/44 |

FOREIGN PATENT DOCUMENTS

| | | | |
|---|---|---|---|
| CH | 677646 A5 | 6/1991 | |
| DE | 10031024 A1 * | 1/2002 | ............. B62D 13/02 |

(Continued)

OTHER PUBLICATIONS

Danish Patent and Trademark Office, Search and Examination Report in PA 2020 70144, Sep. 2, 2020.

(Continued)

*Primary Examiner* — Daniel J Colilla
(74) *Attorney, Agent, or Firm* — Wood Herron & Evans LLP

(57) ABSTRACT

A transportation arrangement (10) includes a truck (32) and a trailer (34) operatively coupled to each other for hauling a blade. A separate dolly vehicle (36) is coupled with the truck and trailer. The transportation arrangement (10) also includes a blade (24) extending between a root end (38) and a tip end (40), wherein a root region (25) of the blade (24) proximate the root end (38) is supported on one of the trailer (34) or dolly vehicle (36) so as to span between the trailer and dolly vehicle. The root region (25) of the blade is pivotable relative to the support element about a first vertical axis (V1) spaced apart from the root end (38). The tip region (29) of the blade (24) proximate the tip end (40) is pivotable relative to the support element about a second vertical axis (Continued)

(V2). At least a portion of the root region (25) and at least a portion of the tip region (29) are configured to extend laterally away from the side of the transportation arrangement when the trailer (34) and dolly vehicle (36) are longitudinally offset from each other.

17 Claims, 31 Drawing Sheets

(56) References Cited

FOREIGN PATENT DOCUMENTS

| DE | 202018106492 U1 | 2/2019 | |
|---|---|---|---|
| EP | 3499027 A1 | 6/2019 | |
| KR | 101614493 B1 * | 4/2016 | ................ B60P 3/40 |
| WO | 2013097858 A1 | 7/2013 | |
| WO | 2015035997 A1 | 3/2015 | |

OTHER PUBLICATIONS

European Patent Office, International Search Report and Written Opinion in PCT Application No. PCT/DK2021/050055, May 19, 2021.

* cited by examiner

APPARATUSES, SYSTEMS AND METHODS FOR THE TRANSPORTATION OF WIND TURBINE BLADES ON ROADWAYS

TECHNICAL FIELD

This invention generally relates to wind turbines, and more particularly to apparatuses, systems, and methods for transporting wind turbine blades and other components to installation sites on vehicles via roadways.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades extending from a hub and supported in the nacelle by means of a shaft. The shaft couples the rotor and blades either directly or indirectly with a generator, which is housed inside the nacelle. Consequently, as wind forces the blades to rotate, electrical energy and power are produced by the generator.

Generally, a wind turbine is assembled at an installation location or site and includes the various components making up the wind turbine. As may be appreciated, assembled wind turbines are very large and thus the various components making up the wind turbine are transported to the installation site individually or in sections and are assembled into the larger structures at the site. One particular set of components of note for such an installation are the long wind turbine blades. A wind turbine uses multiple blades in design with a popular standard using three blade per turbine. It is usually desirable to deliver a single blade to an installation site intact so that it can be installed directly onto the nacelle. Such blades are very long and getting increasingly longer with newer wind turbine designs.

As may be appreciated, the transportation of wind turbine blades from their production site to their installation location or to an interim storage site poses a variety of technical challenges, particularly in view of the ever-increasing length of individual blades. For example, the lengths of some modern wind turbine blades may be in the vicinity of approximately 80 meters (m). Depending on the ultimate installation site, it is often desirable or necessary to transport such blades via roadway, such as with a truck or other suitable vehicle. However, transportation of such long blades can present significant challenges for roadway transportation. For example, interstate roadway profiles, including side clearances, signage, traffic and on/off ramps, are typically tight and vehicles must negotiate curved sections of road as well as complex crowded traffic scenarios.

Generally, wind turbine blades are transported using a semi or tractor truck that tows an extended trailer. The front of the extended trailer attaches to the fifth wheel hitch of the truck and extends rearwardly through an extendable boom to the back wheels of the trailer. The root end of the blade is usually supported on the truck directly behind the truck cab while the tip end is supported at the back of the trailer. Mounting elements or bolsters secure the root end directly behind the cab and usually over the pivot axis associated with the fifth wheel attachment. The root end bolster is typically positioned at the actual root end where the strength of the blade is often relatively high. The tip bolster at the back end of the extended trailer may be positioned somewhat inboard from the actual tip end of the blade (e.g., approximately one-quarter of the blade length therefrom) since the actual tip end of the blade may be too delicate to adequately support the weight of the blade. Therefore, the tip will generally extend past the end of the trailer.

As the truck drives around a curve, the root end will pivot right at the truck cab while the tip end stays aligned with the extended boom or axis of the extended trailer. This presents a particular turn radius for the entire truck/trailer/blade. While such an arrangement has been suitable for some blade lengths, it becomes less so for the longer blades and more current designs. Furthermore, the extendable boom between the front and the back of the trailer sits lower to the road thereby presenting ground clearance issues. Longer and longer blades also require longer and longer booms and thus greater weight for the entire system. The location of the root end and a significant portion of the blade weight is also presented at the axles of the truck, demanding additional axles on the truck and reducing the use of the system on poor or questionable roads.

Accordingly, such prior art arrangements and transportation systems may not be suitable for transporting blades having lengths greater than a particular threshold length for the roads that must be travelled. The turn radiuses may be very limited. For example, there may be insufficient available clearance inside of the curve of a curved section of the road to accommodate the middle region of a particularly long blade as the truck and blade round the curved section. An obstruction may be located along the road on a radially inward side thereof which would impede the middle region of the blade from safely bridging radially inwardly as the blade travels along the road. More particularly, the middle region of the blade could collide with such an obstruction, thereby damaging the blade and potentially rendering the blade unusable.

Consequently, manufacturers of wind turbines and wind turbine components continually strive to improve systems and methods associated with the transportation and handling of wind turbine blades and other long components. It would therefore be desirable to provide improved apparatuses, systems, and methods for transporting a wind turbine blade or similar element via a road that may accommodate maximized blade lengths and ensure a desirable restraint and maneuvering of the blade during transportation.

SUMMARY

In one embodiment, a transportation arrangement includes a truck and a trailer coupled to the truck for being towed. A separate dolly vehicle is positioned behind the truck and trailer. The transportation arrangement also includes a blade extending between a root end and a tip end. A root region of the blade is proximate the root end and is supported on bed portion of the trailer and pivotable relative thereto about a first vertical axis spaced apart from the root end. A tip region of the blade proximate the tip end is supported on separate dolly vehicle and couples the dolly vehicle with the truck and trailer for forming the transportation arrangement. The tip region is pivotable relative to the dolly vehicle about a second vertical axis. At least a portion of the root region is configured to extend laterally away from the side of the transportation arrangement when the trailer and dolly vehicle are longitudinally offset from each other. The second vertical axis may be spaced apart from the tip end, such that at least a portion of the tip region is configured to extend laterally away from a side of the separate dolly vehicle when the trailer and dolly vehicle are longitudinally offset from each other.

The blade may include a middle region between the first and second axes, wherein the middle region is configured to span between trailer and separate dolly vehicle when the trailer and separate dolly vehicle are longitudinally aligned with each other. At least a portion of the middle region is configured to extend laterally away from the side of each of the trailer and separate dolly vehicle when the trailer and separate dolly vehicle are longitudinally offset from each other.

The root region may be configured to overlie the trailer and the tip region is configured to overlie the separate dolly vehicle when the trailer and separate dolly vehicle are longitudinally aligned with each other. In addition or alternatively, the root end and the tip end may be spaced apart from each other by a length, and the first vertical axis may be spaced apart from the root end by a distance equal to approximately one-tenth of the length. In one embodiment, the first vertical axis is spaced apart from the root end by between approximately 6 m and approximately 12 m.

The transportation arrangement may further include a root bolster positioned on and pivotable relative to the trailer about the first vertical axis, wherein the blade is pivotably supported on the trailer via the root bolster. The root bolster may include a rigid arm fixedly coupled to the root end of the blade for transmitting longitudinal acceleration forces from the transportation arrangement to the blade.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
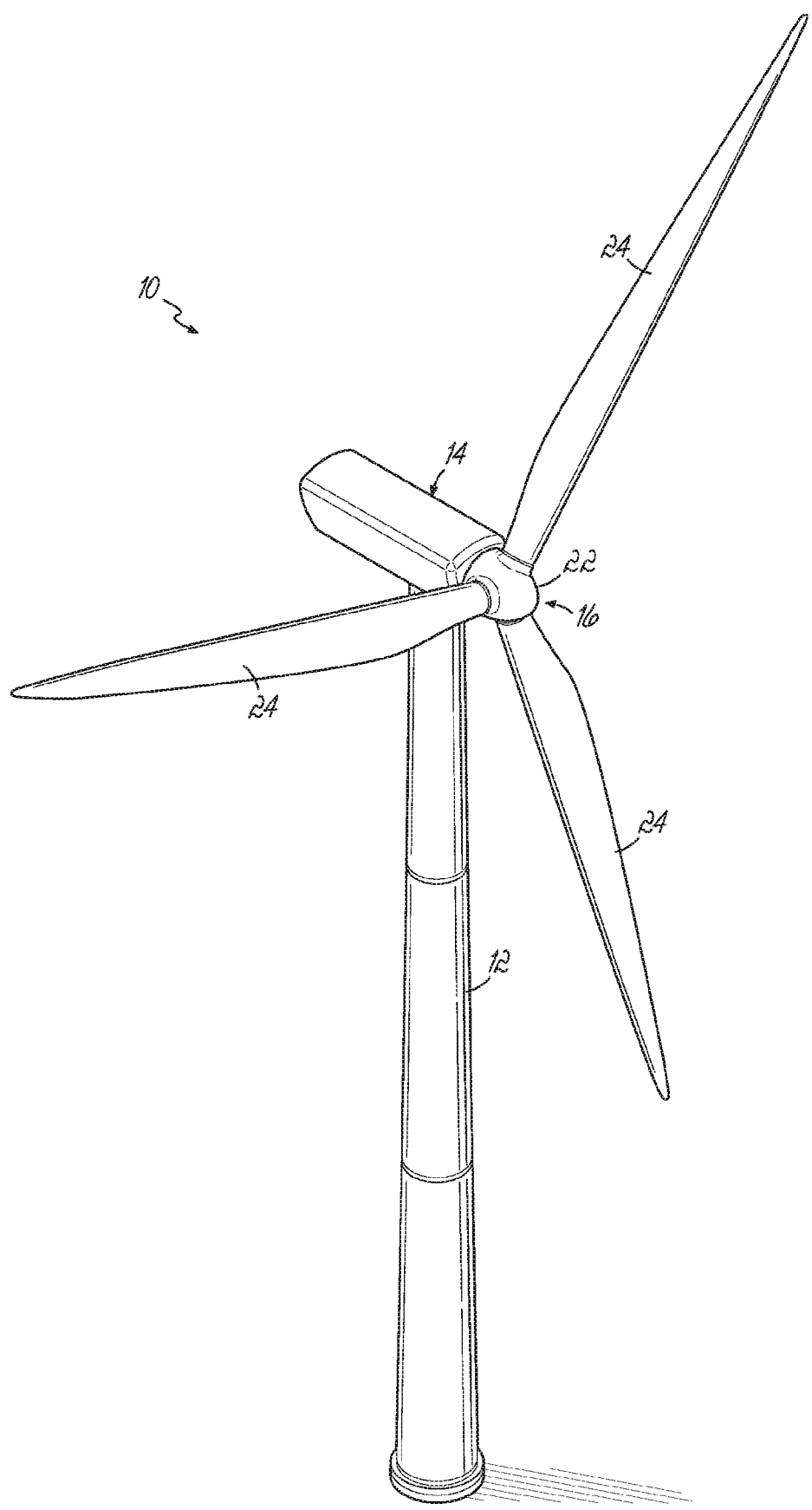
FIG. 1 is a perspective view of a wind turbine having a tower and an energy generating unit.
Figure 2:
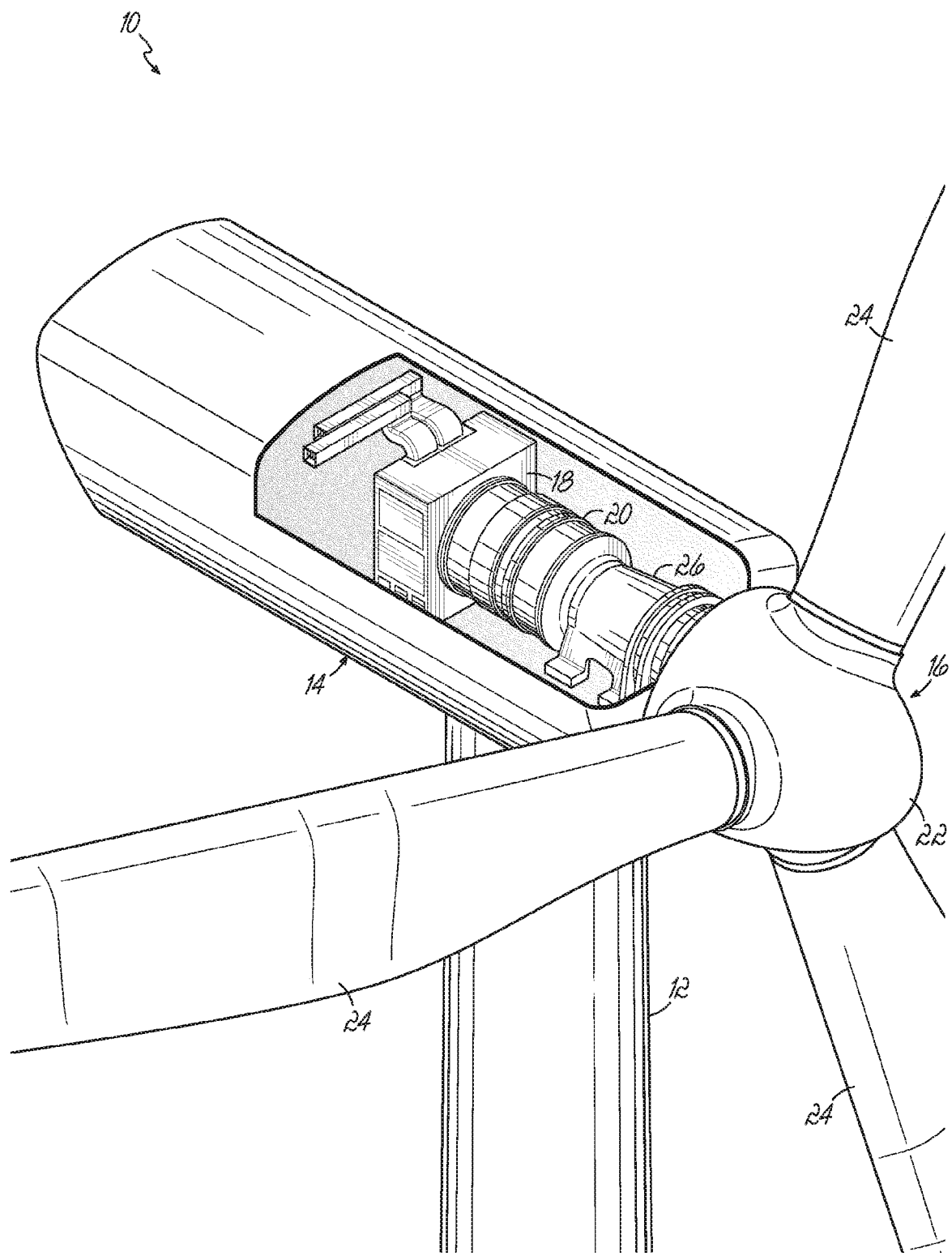
FIG. 2 is a perspective view of functional components of a nacelle of a wind turbine.

With reference to FIGS. 1 and 2, a wind turbine 10 includes a tower 12, a nacelle 14 disposed at the apex of the tower 12, and a rotor 16 operatively coupled to a generator 18 via a gearbox 20 housed inside the nacelle 14. In addition to the generator 18 and gearbox 20, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central hub 22 and a plurality of very long blades 24 that are attached to the central hub 22 at locations distributed about the circumference of the central hub 22. In the representative embodiment, the rotor 16 includes three blades 24, however the number may vary. The blades 24, which project radially outward from the central hub 22, are configured to interact with passing air currents to produce rotational forces that cause the central hub 22 to spin about its longitudinal axis. The design, construction, and operation of the blades 24 are familiar to a person having ordinary skill in the art of wind turbine design and may include additional functional aspects to optimize performance. For example, pitch angle control of the blades 24 may be implemented by a pitch control mechanism (not shown) responsive to wind velocity to optimize power production in low wind conditions, and to feather the blades if wind velocity exceeds design limitations.

The rotor 16 may be coupled to the gearbox 20 directly or, as shown, indirectly via a main shaft (not shown) extending between the hub 22 and the gearbox 20. The main shaft rotates with the rotor 16 and is supported within the nacelle 14 by a main bearing support 26 which supports the weight of the rotor 16 and transfers the loads on the rotor 16 to the tower 12. The gearbox 20 transfers the rotation of the rotor 16 through a coupling to the generator 18. Wind exceeding a minimum level may activate the rotor 16, causing the rotor 16 to rotate in a direction substantially perpendicular to the wind, applying torque to the input shaft of the generator 18. The electrical power produced by the generator 18 may be supplied to a power grid (not shown) or an energy storage system (not shown) for later release to the grid as understood by a person having ordinary skill in the art. In this way, the kinetic energy of the wind may be harnessed by the wind turbine 10 for power generation.

Generally, the wind turbine is transported to the installation site in various parts, components, and sections and then the wind turbine is assembled at the site. As may be appreciated, this entails shipping some significantly large and/or long elements to a location. If that location is an inland location, the shipment will often occur over a roadway or interstate highway. As may be appreciated, the sections of significant length include the blades 24 and the tower 12. While the tower might be assembled from sections that are shipped individually, the long blades are often a singular or unitary structure and thus must be shipped as such in whatever platform or system is used for the transportation of the wind turbine sections.

Figure 3:
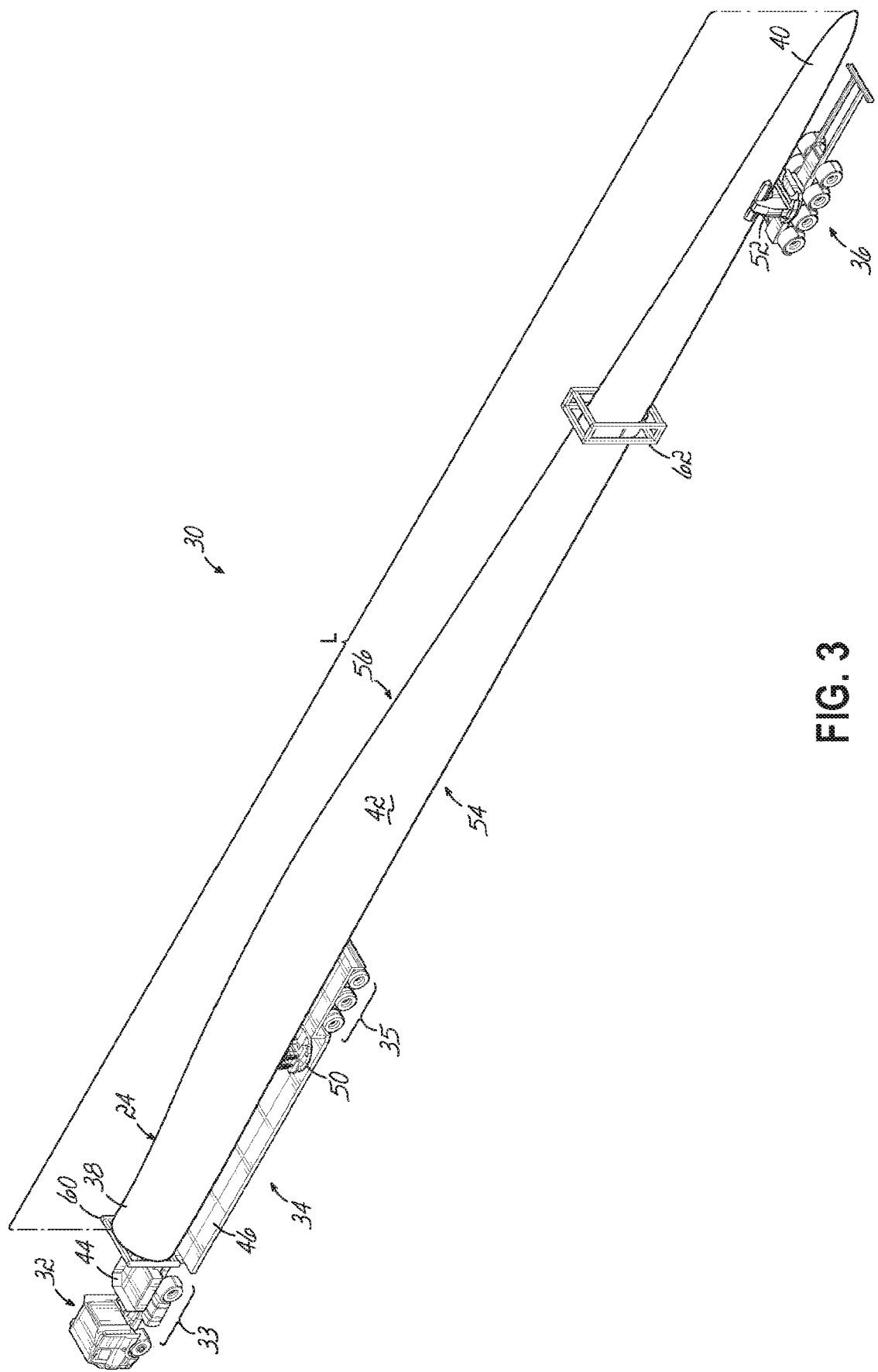
FIG. 3 is a perspective view of a transportation arrangement including a truck and trailer arrangement, a wind turbine blade, a root bolster, and a tip bolster in accordance with an aspect of the invention.

With reference to FIG. 3, an exemplary transportation arrangement 30 for use on a road is illustrated and includes a towing vehicle, such as a tractor truck or semi-truck 32 and a trailer 34 (as discussed herein) for supporting a root end 38 of the blade 24. The trailer is towed behind the truck. In one embodiment of the invention, a detached and separate dolly 36 is coupled with and supports the tip end 40 of the blade. In accordance with one aspect of the invention, the blade body 42 couples the truck/trailer 32, 34 and the dolly vehicle 36 and forms a transportation arrangement to provide the transportation improvements as discussed herein. The truck 32 includes a bed portion 33 spaced rearwardly of the truck that couples with the front end 44 of the trailer 34. For example, a fifth wheel arrangement (not shown), as known for towing a trailer, might be incorporated between the truck and trailer for providing pivoting of the trailer 34 about the bed 33 or rear of the truck as the arrangement drives down a road. The trailer 34 includes a flat bed or tow bed 46 that extends or is spaced rearwardly behind the truck 32 for supporting a root bolster 50 and the root end of the blade as shown in FIG. 3 spaced rearwardly from the truck or other vehicle.

Figure 7:
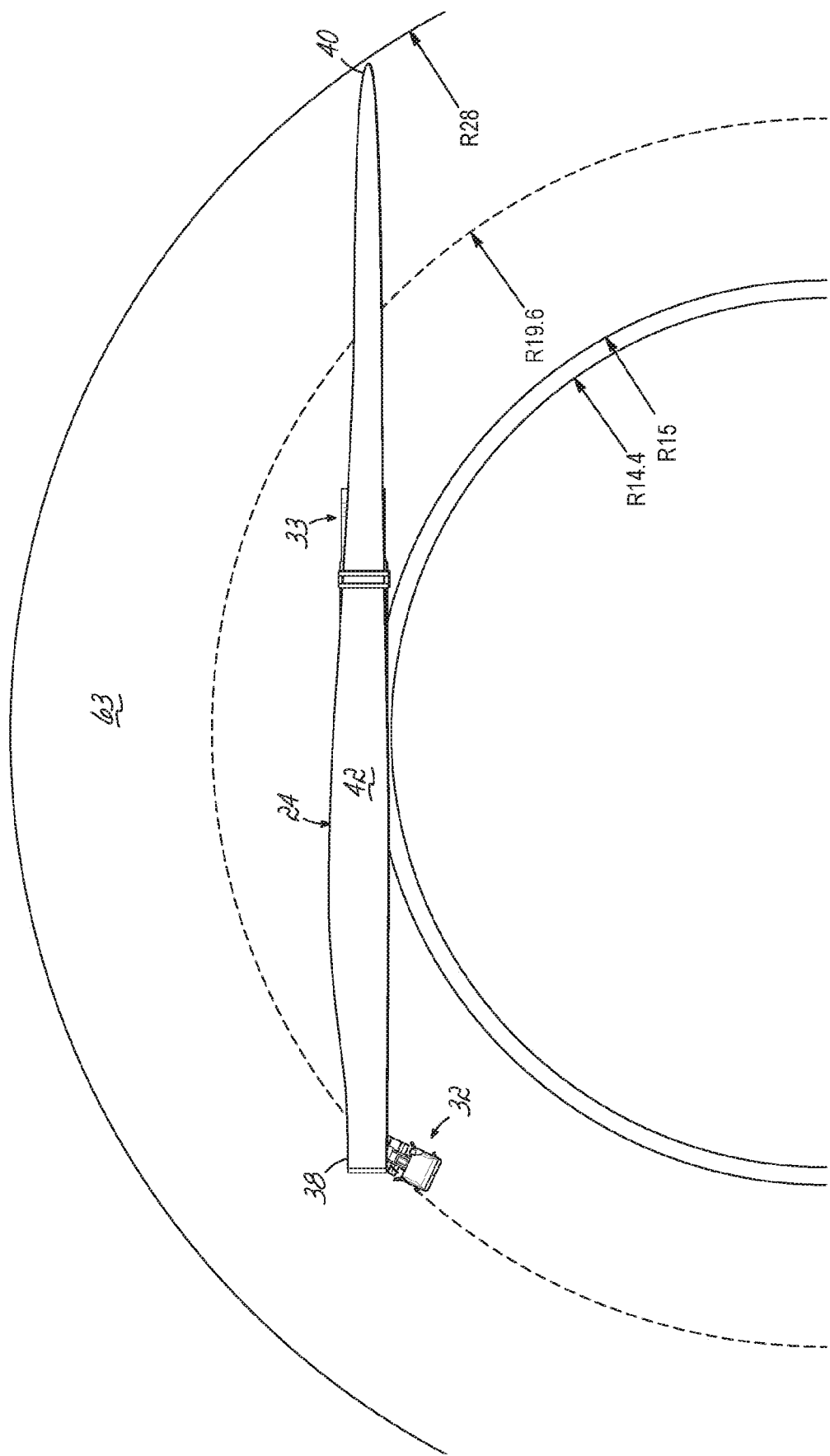
FIG. 7 is a top elevation view showing a transportation system rounding a first curved section of a roadway.
Figure 8:
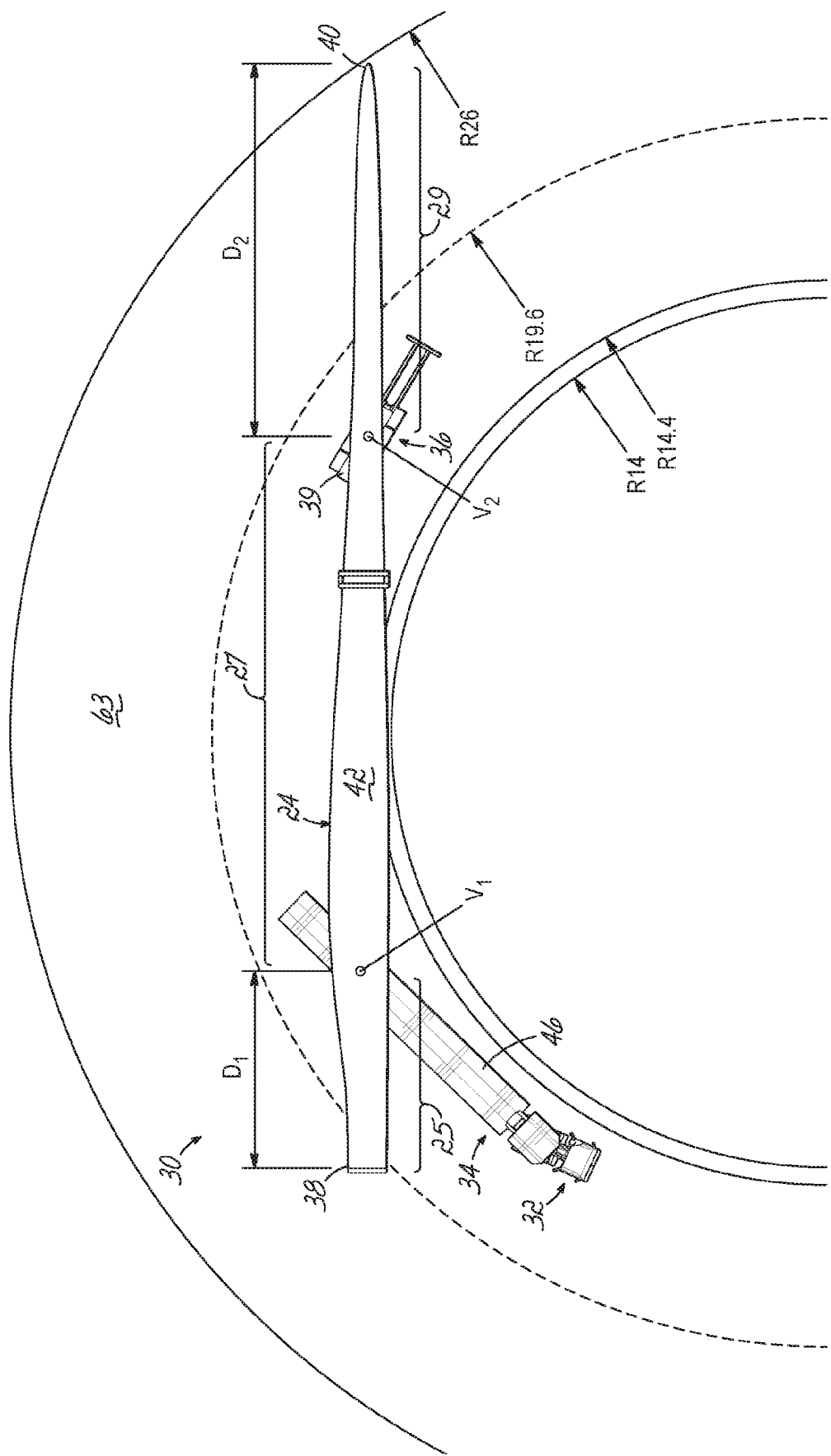
FIG. 8 is a top elevation view similar to FIG. 7, showing a transportation system in accordance with an embodiment of the invention rounding a first curved section of a roadway.

The transportation arrangement 30 includes vertically pivotable and rotatable root and tip bolsters 50, 52 positioned on the separate trailer 34 and dolly 36, respectively, and the blade 24 is supported by the root and tip bolsters 50, 52 such that the blade spans between trailer 34 and dolly vehicle 36 to complete the arrangement. That is, in one embodiment, the blade is part of the actual transportation arrangement to provide coupling between components thereof. As described in greater detail below, the root and tip bolsters 50, 52 may each be positioned at inboard locations along the blade 24 such that the ends of the blade 24 may be capable of swinging laterally outwardly from the first and/or second sides 54, 56 of the arrangement as the truck 32 and trailer 34 round a curved section of the road, for example. FIGS. 7 and 8 show a left hand turn with the blade swinging out to the right or second side 56 of the arrangement. This thereby allows the blade 24 to have an increased length and still be transported with the inventive transportation system as compared to those allowed by prior roadway transportation arrangements. A right hard turn is similarly possible with the system 30 with portions of the blade extending laterally to the left side 54.

The blade 24 may be of any suitable configuration and may include, for example, a root end 38, a tip end 40, a leading edge 146, a trailing edge 148, a pressure side 150, and a suction side 152 as is typical with wind turbine blades (see FIGS. 12A-12E). As best shown in FIG. 3, the root end 38 and the tip end 40 of the blade 24 are spaced apart by a length L of the blade 24. In one embodiment, the length L of the blade 24 may be between approximately 46 m and approximately 91 m. For example, the length L of the blade 24 may be approximately 75 m. The leading edge 146 and the trailing edge 148 of the blade 24 are spaced apart by a chord which varies along the length L of the blade 24. The illustrated blade 24 may be outfitted with a root frame 60 rigidly coupled to the blade 24 at the root end 38 and a tip frame 62 rigidly coupled to the blade 24 between the root end 38 and the tip end 40 to provide lifting points for hoisting the blade 24, for example, onto and off of the arrangement of the invention.

Figure 4:
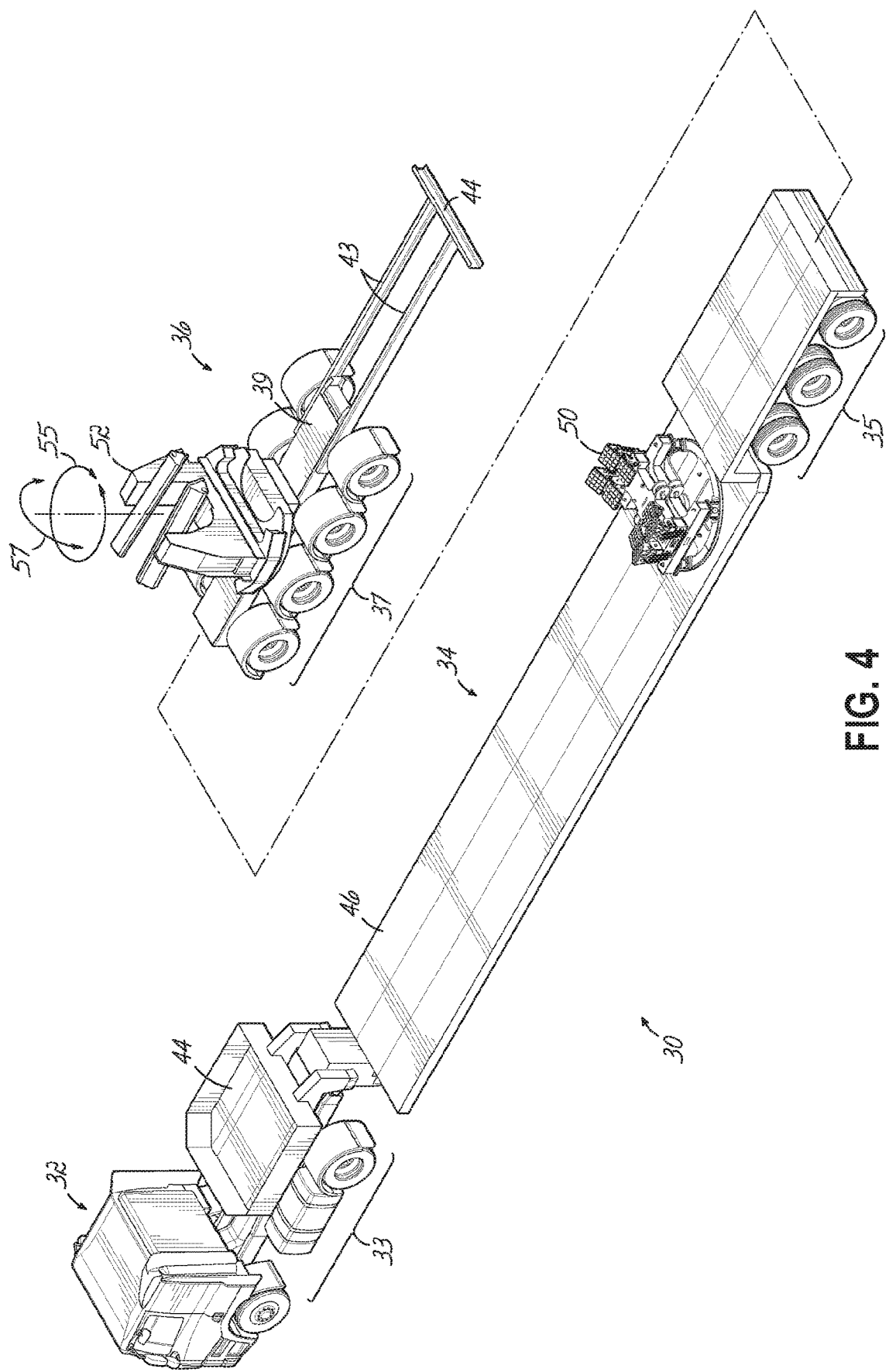
FIG. 4 is a perspective view of a transportation arrangement similar to FIG. 3 illustrating the truck and trailer arrangement, a root bolster, and a tip bolster in accordance with an aspect of the invention.
Figure 5:
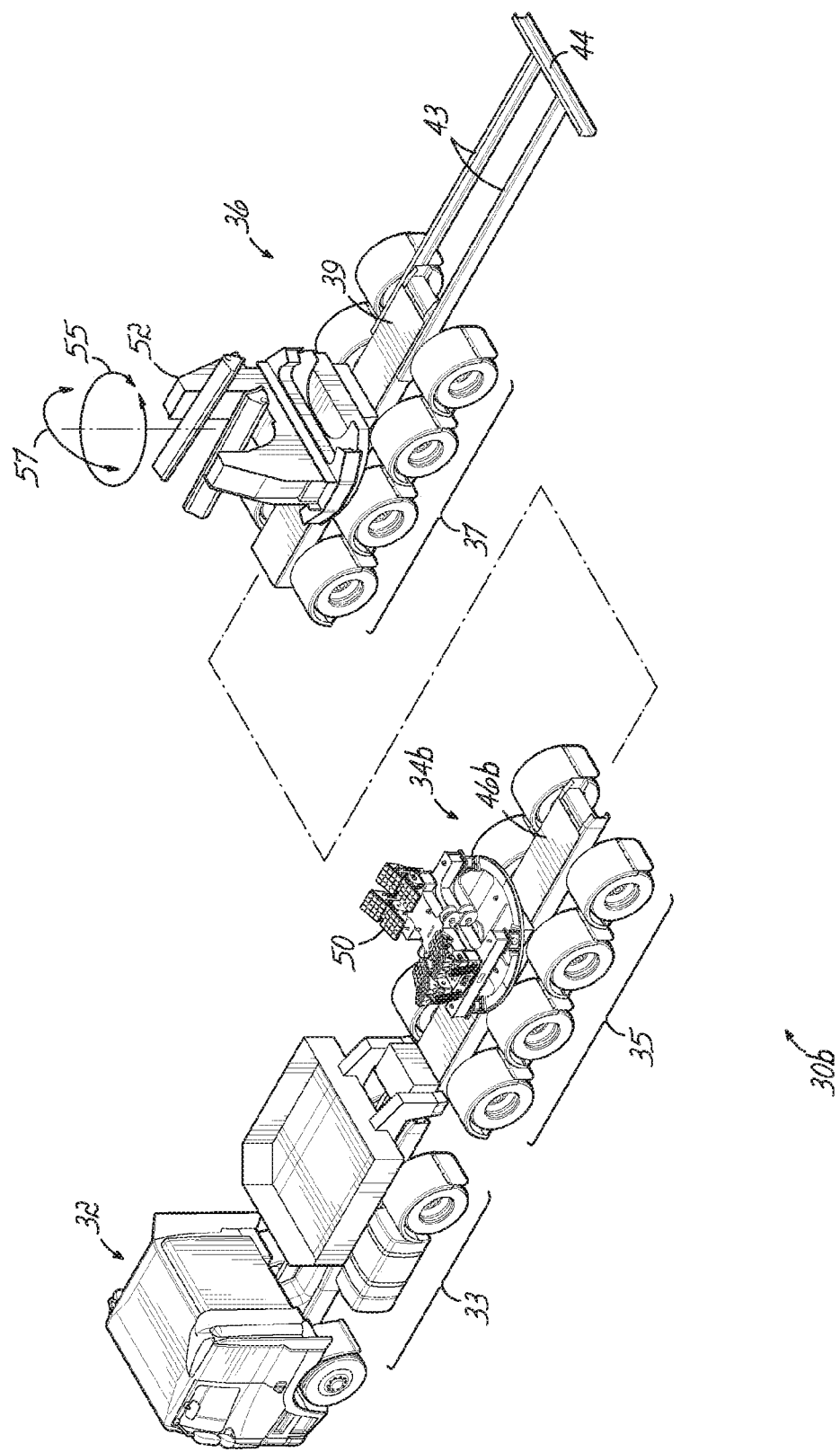
FIG. 5 is a perspective view of an alternative embodiment of a transportation arrangement illustrating the truck and trailer arrangement, a root bolster, and a tip bolster in accordance with an aspect of the invention.
Figure 6:
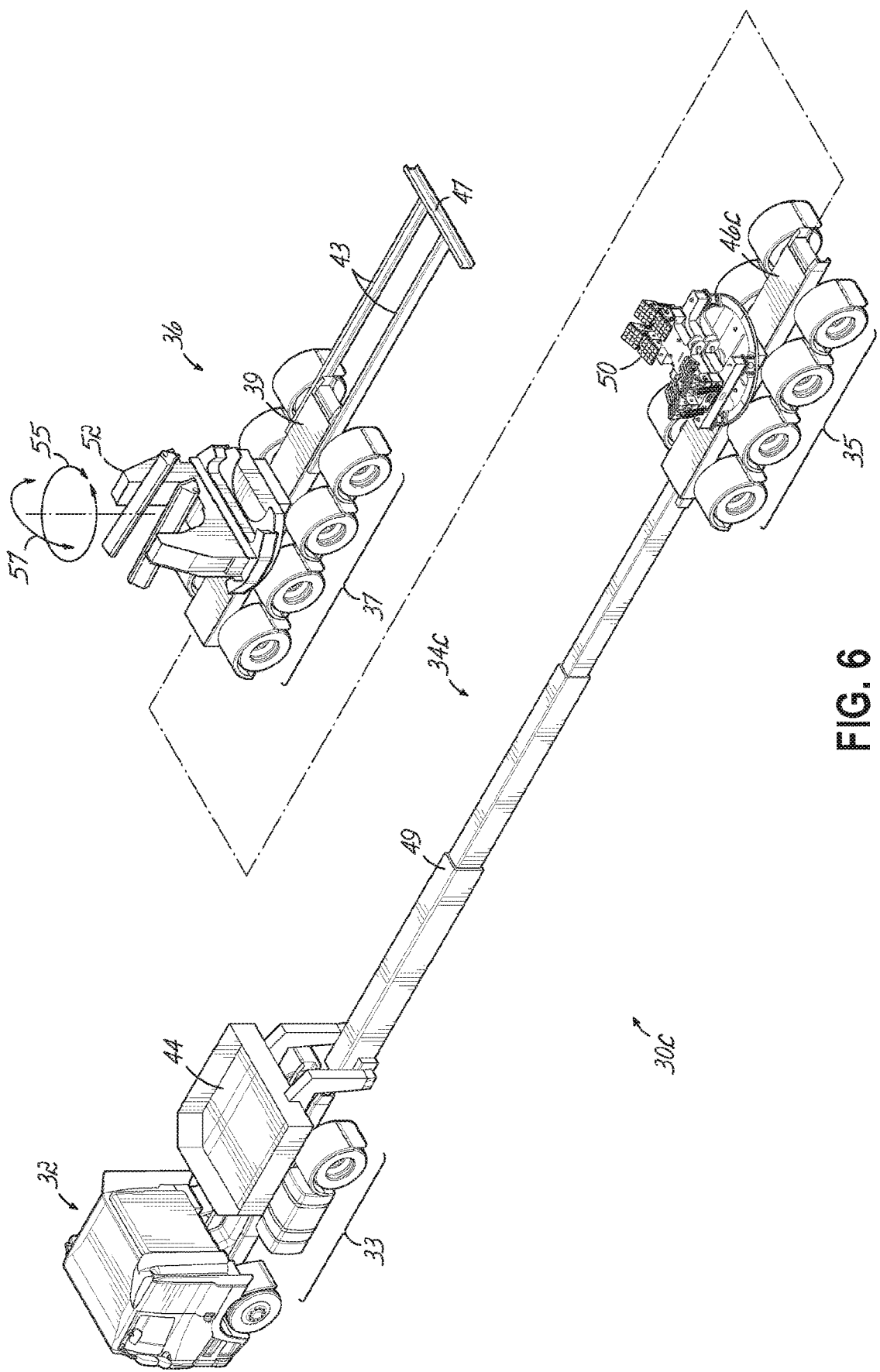
FIG. 6 is a perspective view of an alternative embodiment of a transportation arrangement illustrating the truck and trailer arrangement, a root bolster, and a tip bolster in accordance with an aspect of the invention.

FIGS. 4-6 illustrate a variety of exemplary embodiments for implementing the transportation arrangement 30 of the invention. As noted, a truck 32 including a front axle and one or more rear axles may be utilized to provide the towing power for the arrangement. As used herein, the term "truck" is used to denote a towing vehicle and the invention is not limited to a specific truck form. Trailer 34 is coupled to the truck 32 such as through a fifth wheel coupling or other suitable towing arrangement between the front end 44 of the trailer and the bed 33 or rear end of the truck. Trailer 34 includes a low tow bed 46 that extends or is spaced rearwardly from the front end 44 back to one or more rear axles 35 of the trailer. Bolster 50, as discussed further herein, is positioned toward the rear end of the tow bed to space it rearwardly from the truck 32. Bolster 50 may be positioned forward of the rear axles 35 as illustrated in FIG. 4 or may be positioned on the portion of bed 46 above the axles 35. Bolster 50 rotates about bed 46 and also provides rocking or tilting of the root end 38 of the blade for maneuverability of the arrangement 30 and transportation of the blade as illustrated in FIG. 4.

In accordance with another feature of the invention, a separate dolly vehicle 36 is positioned rearwardly of the truck and trailer to receive the tip end 40 of the blade or a portion of the blade proximate the tip end as illustrated in FIG. 3. Dolly vehicle 36 includes one or more axles 37 and a bed 39 on which bolster 52 is mounted. Bolster 52 also rotates on bed 39 and rocks or tilts from side to side to provide movement of the tip end 40 as the blade is transported. In accordance with a feature of the invention, the separate and detached dolly vehicle operates with the body of the blade 24 to couple the dolly vehicle with the truck/trailer and provide the overall connected transportation arrangement of the invention. That is, the blade 24 provides the structural support and coupling connection between the truck and dolly vehicle. Dolly vehicle 36 may include a rear bumper 44 extending from the bed 39 on frame elements 43, such as for the purposes of taillights, licensing, etc. Dolly vehicle 36 is pulled along by truck 32 through the pulling or towing of the blade 24 as illustrated in FIG. 3.

The transportation arrangement includes the truck 32, trailer 34 coupled with the truck for being towed behind the truck and the separate dolly vehicle 36. The trailer and dolly vehicle include bed portions spaced rearwardly of the truck. The blade 24 extends between a root end 38 and the tip end 40. A root region 25 of the blade 24 proximate to the root end 38 is supported on the bed portion 46 of the trailer 34 on bolster 50 and is pivotable relative thereto about a first vertical axis V1 spaced apart from the root end 38. A tip region 29 of the blade 24 is proximate to the tip end 40 and is supported on the bed portion 39 of the separate dolly vehicle 36 for coupling the dolly vehicle with the truck and trailer for forming the transportation arrangement. The tip region 29 is pivotable relative to the dolly vehicle on bolster 52 about a second vertical axis V2. At least a portion of the root region 25 is configured to extend laterally away from a side of the trailer 34 when the trailer and separate dolly vehicle 36 are longitudinally offset from each other. The second axis V2 is spaced apart from the tip end 24, such that at least a portion of a tip region 29 is configured to extend laterally away from a side of the separate dolly vehicle 36 when the trailer 34 and separate dolly vehicle 36 are longitudinally offset from each other.

That is, the various trucks, trailers and dolly vehicles work with the blade to provide the transportation arrangement. The blade 24 includes a middle region 27 between the first and second axes V1, V2, wherein the middle region 27 is configured to span between trailer 34 and separate dolly vehicle 36 when the trailer 34 and separate dolly vehicle 36 are longitudinally aligned with each other. At least a portion of the middle region 27 is configured to extend laterally away from the side of each of the trailer 34 and separate dolly vehicle 36 when the trailer 34 and separate dolly vehicle 36 are longitudinally offset from each other.

One embodiment of the root bolster 50, as disclosed herein, essentially cradles the root end 38 of the blade 24. As discussed herein, the root end of the blade may be strapped to bolster 50 with suitable webbing straps and also may be coupled to the bolster through a rigid arm or boom as described herein. The tip bolster 52 may grip the tip end 40 of the blade as discussed herein with respect to FIGS. 10-10B, 12A-12F to secure the tip end with the separate dolly vehicle 36. Alternatively, the tip bolster 52 might more closely resemble the root bolster 50 as illustrated in FIG. 4A and may cradle the tip end and be strapped to the tip end or a portion or tip region 29, such as by suitable straps.

Figure 4A:
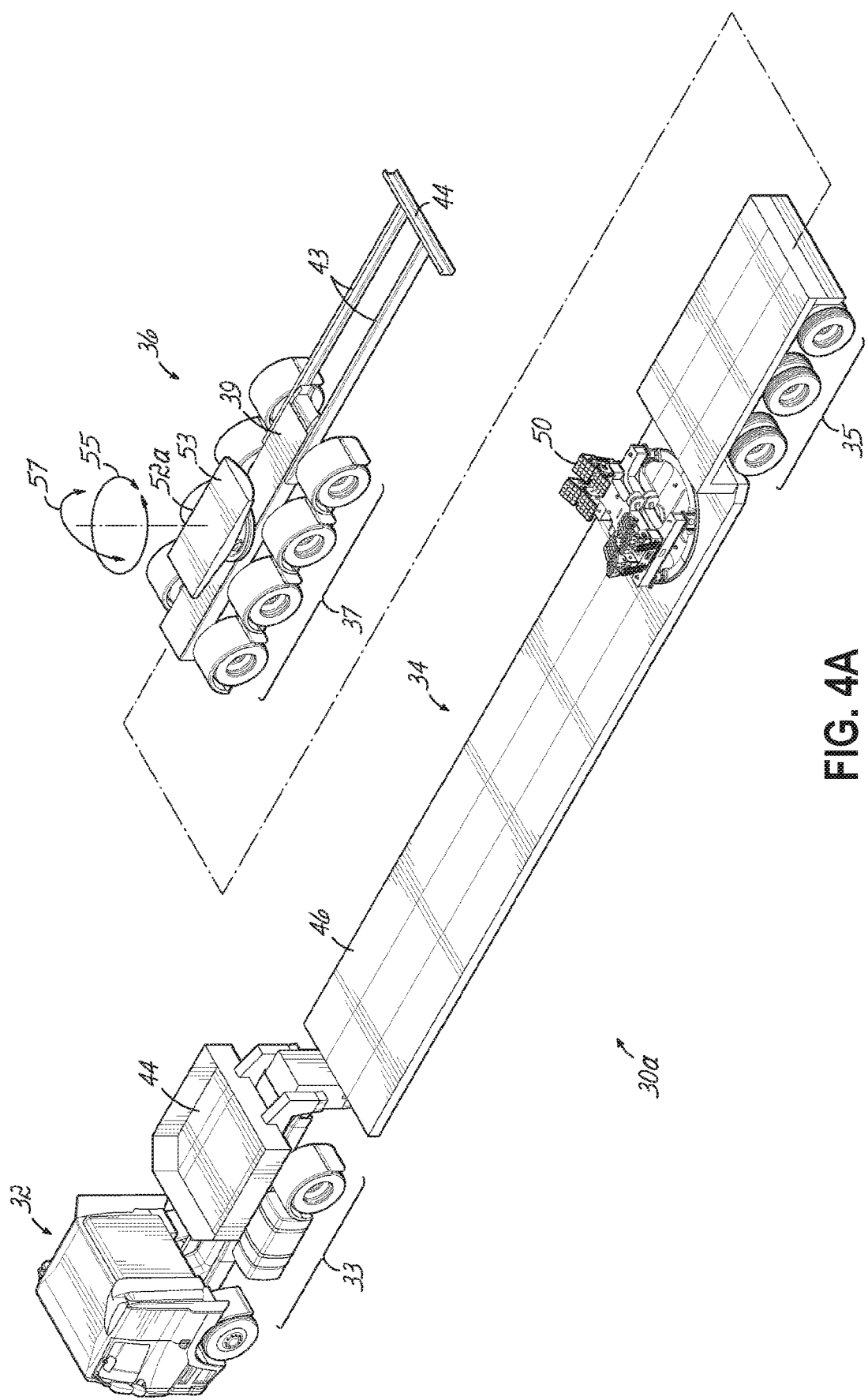
FIG. 4A is a perspective view of an alternative embodiment of a transportation arrangement illustrating the truck and trailer arrangement, a root bolster, and a tip bolster in accordance with an aspect of the invention.

FIG. 4A shows an alternative arrangements 30a which incorporates an alternative tip bolster 52a on the rear dolly vehicle 36. Bolster 52a has a surface 53 configured for receiving the blade proximate the tip end of the blade. The bolster 52a may rotate about a vertical axis as illustrated by arrow 55 and may rotate about a horizontal axis as illustrated by arrow 57 to provide suitable movement of the tip as the dolly vehicle 36 is towed behind the truck in the arrangement. The tip end 40 of the blade or a portion or region 29 of the blade proximate the tip end 40 may be secured to bolster 52a, and particularly to the receiving surface 53 by suitable web straps such as those shown in FIG. 11F for the bolster.

FIGS. 5-6 illustrate additional alternative embodiments of the arrangement incorporating other trailer structures to be coupled with truck 32. Specifically, referring to FIG. 5 which shows alternative arrangement 30b, a trailer structure, often referred to as a jeep dolly 34b may be coupled to truck 32 for towing behind the truck. The jeep dolly 34b may be coupled through an appropriate towing coupling, such as a fifth wheel coupling, to truck 32. The jeep dolly 34b includes a bed surface 46b spaced rearwardly of the truck bed that supports a root bolster 50 as illustrated. The jeep dolly 34b moves the root bolster and the root end of the blade 24 rearwardly from the truck 32 that allows blade overhang on the bolster in accordance with the invention. In that way certain benefits of the invention may be recognized. The bolster 50 provides a pivot point for the root end of the blade spaced rearwardly of the truck. Depending upon the length of the jeep dolly 34b and the placement of the root bolster 50, it provides the rearward spacing or pivot location somewhat similar to the location provided in the flatbed trailer 34 as disclosed in the embodiment in FIG. 4. The rearward placement of the root bolster 50 and the root end of the blade rearwardly of the cab provides significant advantages in the transportation of a blade over a roadway by providing an overhang of the root end of the blade from the truck in turning scenarios. In one embodiment of the invention, the configuration as shown in FIG. 5 might be used with a detached rear dolly vehicle. That is, the rear dolly vehicle 36 is detached and is separate similar to that component as described in the arrangement shown in FIG. 4. The dolly vehicle 36 may be configured with a tip bolster 52 as shown or might use a tip bolster 52a as shown in FIG. 4A.

FIG. 6 illustrates a further embodiment of a rearwardly distant root bolster for realizing the invention. Specifically, an extendable trailer 34c is implemented having an extendable boom 49 that couples with the bed 46c of the trailer to house a root bolster 50 rearwardly of the truck 32. The front end of the boom 49 may be coupled with the truck 32 through an appropriate mounting arrangement, such as a fifth wheel arrangement. Root bolster 50 then sits on the bed 46c of trailer 34c in order to receive the root end of the blade in accordance with aspects of the invention. A separate and detached dolly vehicle 36 is then coupled with the tip end of the blade is shown in FIG. 3.

Figure 6A:
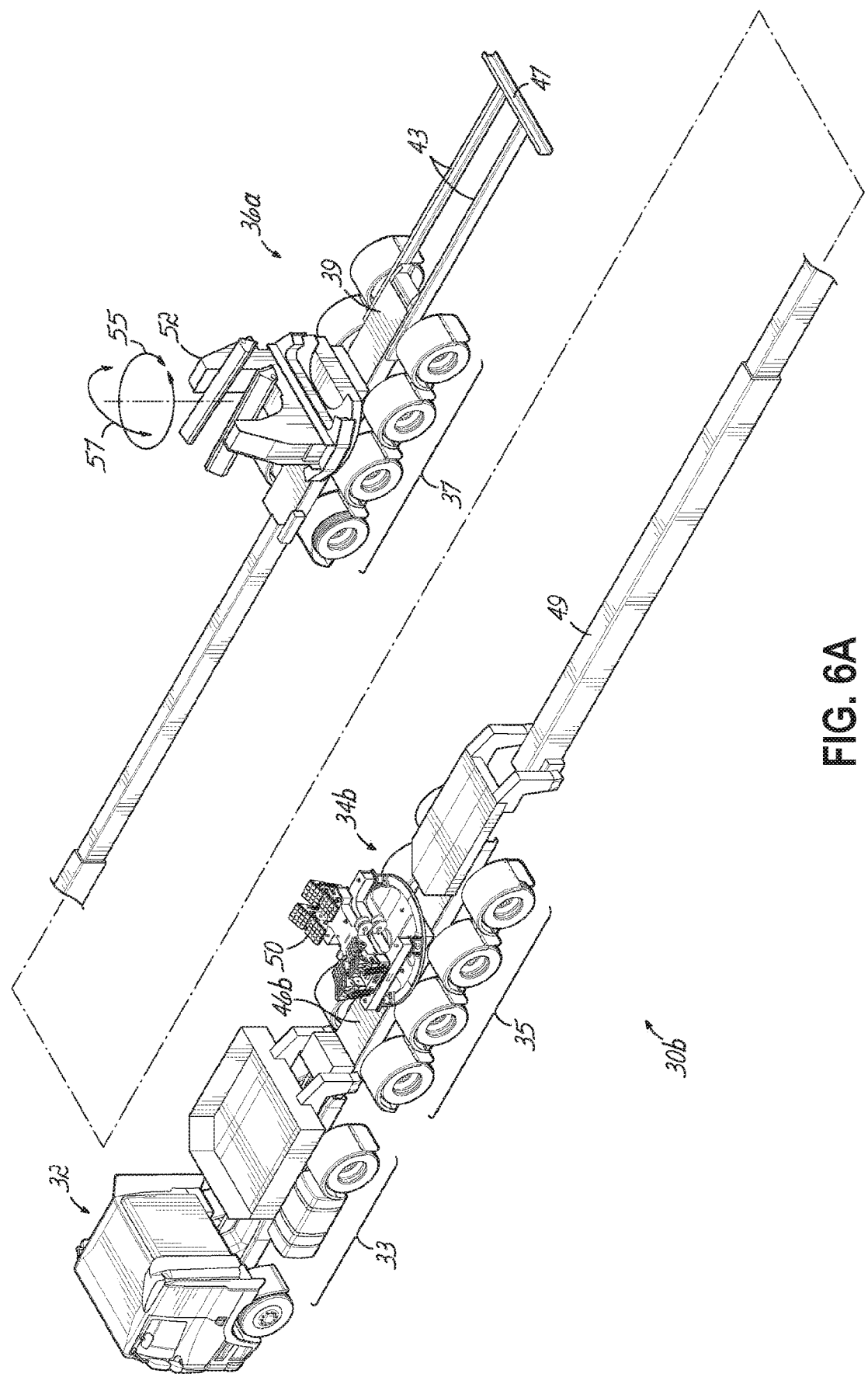

In various of the embodiments of the invention, a separate dolly vehicle 36 might be utilized in combination with the front end support of the blade 24. However, in another embodiment of the invention, an attached trailer, rather than a separate dolly vehicle, might be utilized in combination with the various trailer arrangements 34, 34b, 34c that provide the front end support of the blade. For example, a rear trailer (36a) such as that shown in FIG. 6A might be utilized with the various front end support arrangements as illustrated in FIGS. 3-6A. In such an arrangement, it would not be required to have only the blade body 42 couple the root end and tip end to form the transportation arrangement to provide the transportation improvements as discussed herein. The trailer 36a, which might be an extendable or telescopic trailer as shown in FIG. 6A, could be coupled with the truck and trailer arrangements such as through an appropriate towing coupling. The trailer 36a has an extendable section 49 to couple with a rear section of the trailer as shown for supporting an end of the blade. For example, a fifth wheel arrangement (not shown), as known for towing a trailer, might be incorporated between the truck/trailer and the trailer 36a for supporting the rear end of the blade, whether that is the root end or the tip end. In that way, the trailer 36a would be towed along with the blade behind the forward truck/trailer arrangement. The rearward pivot point V1 provides the benefits of the invention as discussed herein. As also discussed herein, the trailer 36a will include an appropriate root and/or tip bolster 52 positioned on the trailer 36a for support of the blade end to complete the arrangement. As will be understood by a person of ordinary skill in the art, the trailer 36a, as shown in FIG. 6A, may also be used with other of the various front end arrangements as shown in FIGS. 3-6 as appropriate for supporting the rear end of the blade 24 with one of those arrangements 30, 30a, 30b, 30c.

Furthermore, in accordance with another feature of the invention, the various bolsters are shown to be mounted on various flat bed platforms, such as the bed 39 of the dolly vehicle 36 as shown in the figures. However, the dolly vehicle 36 might incorporate a frame structure, (not shown) for implementing and supporting the appropriate bolster structure to support the blade in the transportation arrangement without a flat bed or other flat platform. Therefore, the invention is not limited to the way in which the bolsters are supported and mounted with the elements of the arrangement, such as the dolly vehicle or other structure.

As shown in FIG. 8, the blade 24 is pivotable relative to the bed 46 of the trailer 34 carrying the root bolster 50 about a first vertical axis $V_1$ spaced apart from the root end 38 by a first distance D1 and defined by the root bolster 50, and the blade 24 is pivotable relative to the separate dolly vehicle 36 carrying the tip bolster 52 about a second vertical axis $V_2$ spaced apart from the tip end 40 by a second distance D2 and defined by the tip bolster 52. In the embodiment shown, the first vertical axis V1 is positioned between the root end 38 and the shoulder of the blade 24. In any event, a root region 25 of the blade 24 may be defined between the root end 38 of the blade 24 and the first vertical axis $V_1$, a middle region 27 of the blade 24 may be defined between the first and second vertical axes $V_1$, $V_2$, and a tip region 29 of the blade 24 may be defined between the tip end 40 of the blade 24 and the second vertical axis $V_2$. The root region 25 or a portion thereof is configured to extend laterally away from a side of the trailer 34 when the trailer and dolly vehicle 36 are longitudinally offset as shown. Also, the tip region 29 or a portion thereof is also configured to extend laterally away from the dolly vehicle 36 when there is a longitudinal offset in a roadway curve.

In one embodiment, the first distance D1 may be equal to approximately one-tenth of the length L of the blade 24. For example, the first distance D1 may be between approximately 6 m and approximately 12 m. In the embodiment shown, the first distance D1 may be approximately 7 m. In one embodiment, the second distance D2 may be equal to approximately one-quarter of the length L of the blade 24. For example, the second distance D2 may be between approximately 15 m and approximately 21 m. In the embodiment shown, the second distance D2 may be approximately 17 m.

Thus, the root region 25 and the tip region 29 of the blade 24 may each be configured to extend laterally away from a radially outward sides of the truck 32 and trailer 34 and dolly vehicle 36 and the middle region 27 of the blade 24 may be configured to extend laterally away from a radially inward side of the arrangement 30 as shown in FIG. 8.

FIGS. 7 and 8 illustrate graphically the tighter transportation radiuses that may be achieved with long blades while utilizing the present invention.

Specifically, FIG. 7 illustrates the transportation arrangement utilizing a typical truck and boom-extended trailer transporting a wind turbine blade 24. The root end 38 of the blade is positioned on the bed of the truck right behind the cab section of the truck. The tip end, and or a portion proximate the tip end 40 as illustrated in FIG. 7 is positioned over the back axles of the trailer 33 and the blade stays in alignment with the boom-extended trailer 33. To navigate a curve and a roadway 63 that has an inner radius of R14.4, the truck 32 must navigate out into the middle of the roadway 63 and the tip end 40 of the blade 24 would still maintain an outer radius R28.

Turning to the arrangement illustrated in FIG. 8 incorporating features of the present invention, with the pivot points $V_1$, $V_2$ positioned respectively rearwardly of the truck and also on the detached dolly vehicle 36, the transportation arrangement can navigate a tighter inner radius R14 and also a tighter outer radius R26. As will be appreciated, the various turn radiuses to be achieved for both the inner side of the blade 24 as well as the root end 38 and tip end 40 may vary based upon the length of the blade as well as how far back from the cab of the truck 32 the root bolster and pivot point $V_1$ are located.

Therefore, the positioning of the first and second vertical axes $V_1$, $V_2$, via the positioning of the respective bolsters 50, 52, may allow the blade 24 to have a maximized length L which efficiently utilizes the available side clearances along the roadway while ensuring that the entire blade 24 stays in the roadway and avoids obstructions adjacent to the roadway.

Figure 3A:
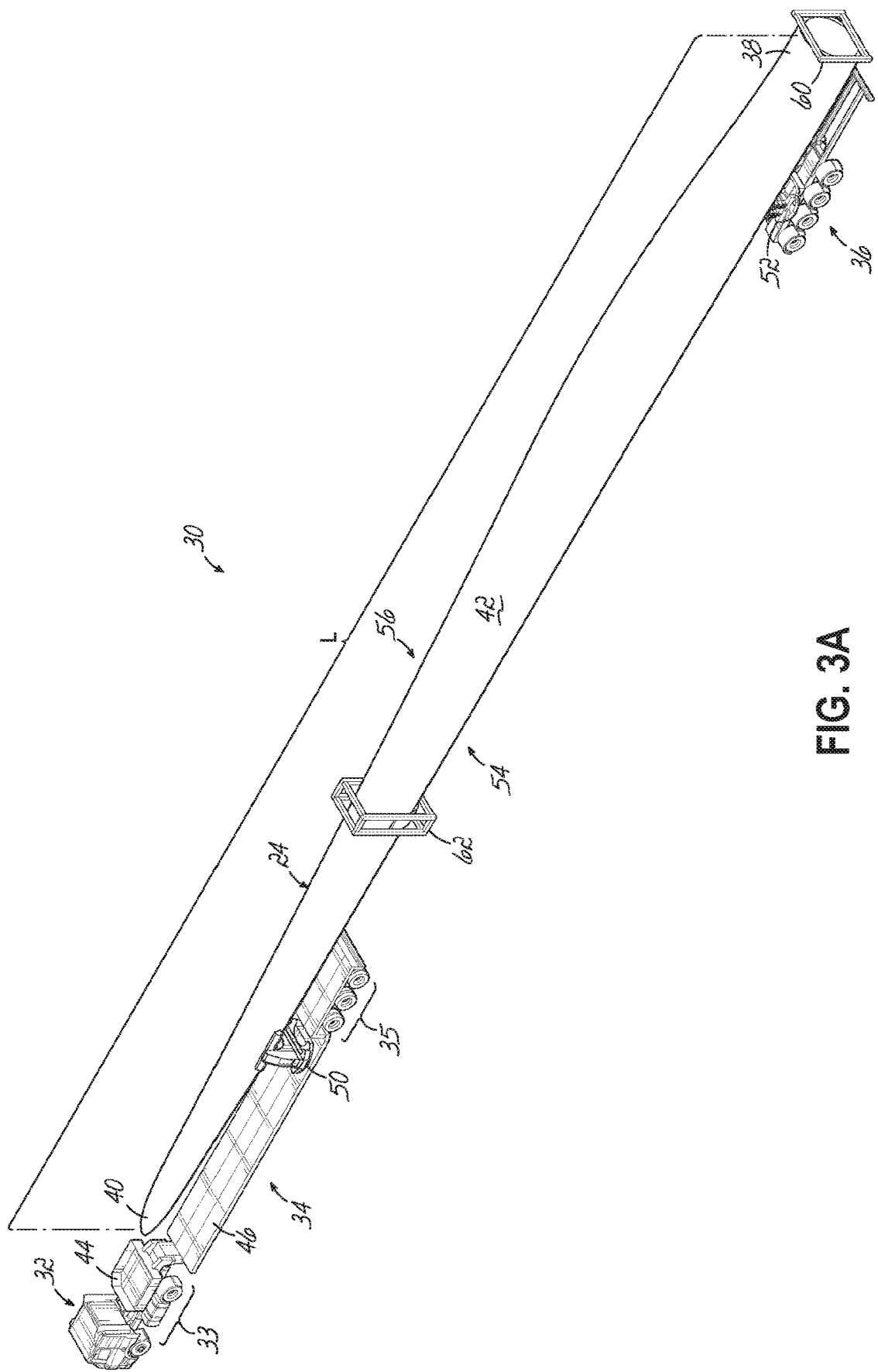
FIG. 3A is a perspective view of an alternative transportation arrangement as in FIG. 3 showing an alternative arrangement of the wind turbine blade, a root bolster, and tip bolster.

While various of the embodiments discussed herein implement the root end 38 of the blade 24 and the bolster 50 therefore proximate to the truck 32 with the tip end 40 and bolster 52 positioned with the trailing dolly vehicle 36, the positioning of the blade may be flipped such that the tip end 40 and appropriate dolly structure is positioned proximate to the truck, such as on the bed 46 of trailer 34. In such a case, the appropriate tip bolster 52 would be positioned on the bed 46 and the appropriate root bolster 50 will be positioned on the dolly vehicle 36 as illustrated in FIG. 3A. Such an arrangement provides similar benefits of having the root end 38 and tip end 40 pivoting about axes $V_1$, $V_2$ to give the benefits of the transportation arrangement 30 and the tighter turning radius of that arrangement. Accordingly, the benefits of the invention may be realized with either the root end 38 or the tip end 40 of the blade facing forward in the direction of movement of the truck 32.

In accordance with one aspect of the invention, the various ends of the blade, including the root end and the tip end are supported on the transportation vehicles and structures with supports or bolster elements, such as root bolster 50 and tip bolster 52. Such bolsters may take various suitable forms. FIGS. 9-13C illustrate various bolster structures that might be used with the transportation arrangement of the invention as appropriate.

Figure 9:
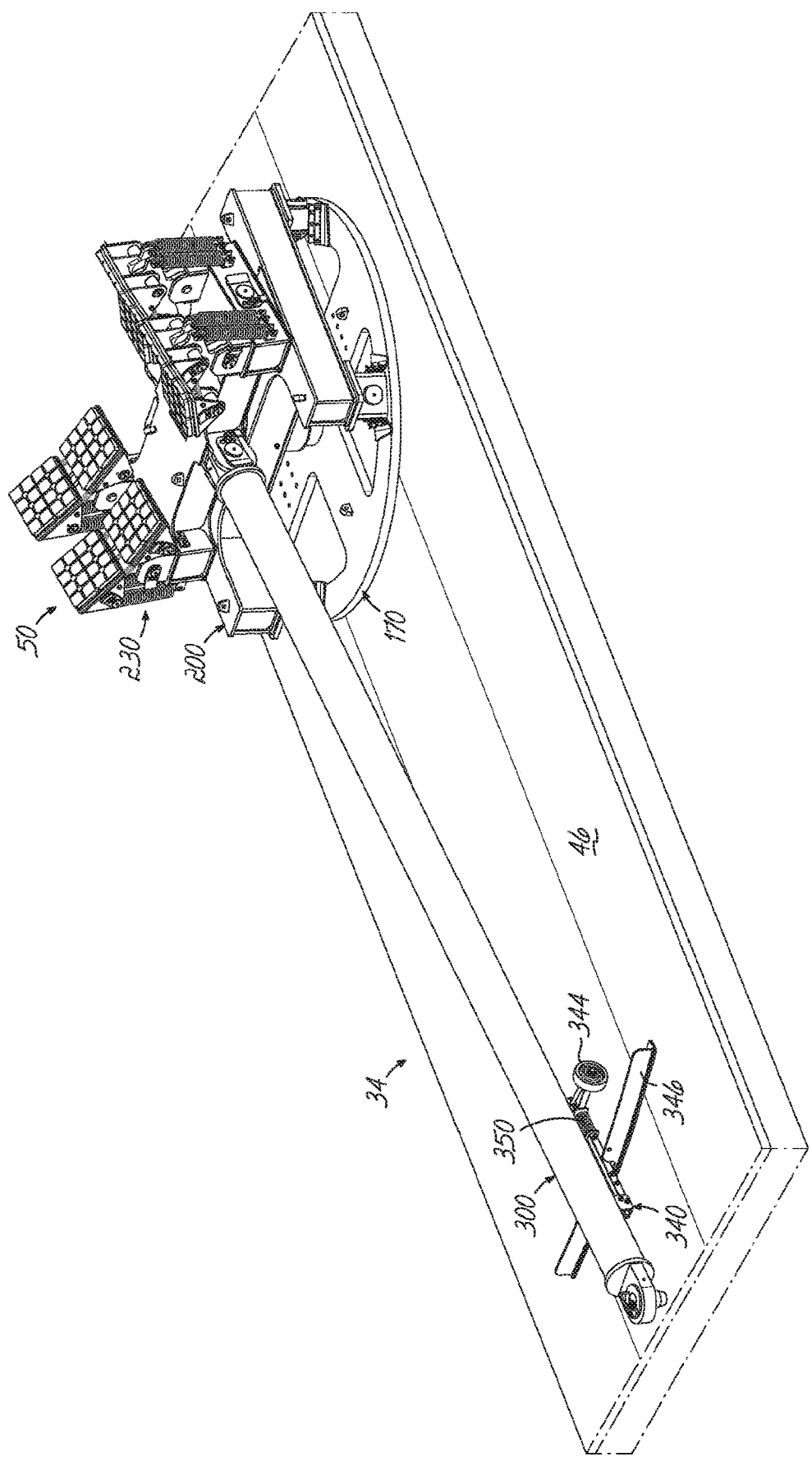
FIG. 9 is a front perspective view of an embodiment of a root bolster of FIG. 4 pivotably mounted to a root fixture fixed to the bed a trailer.
Figure 9A:
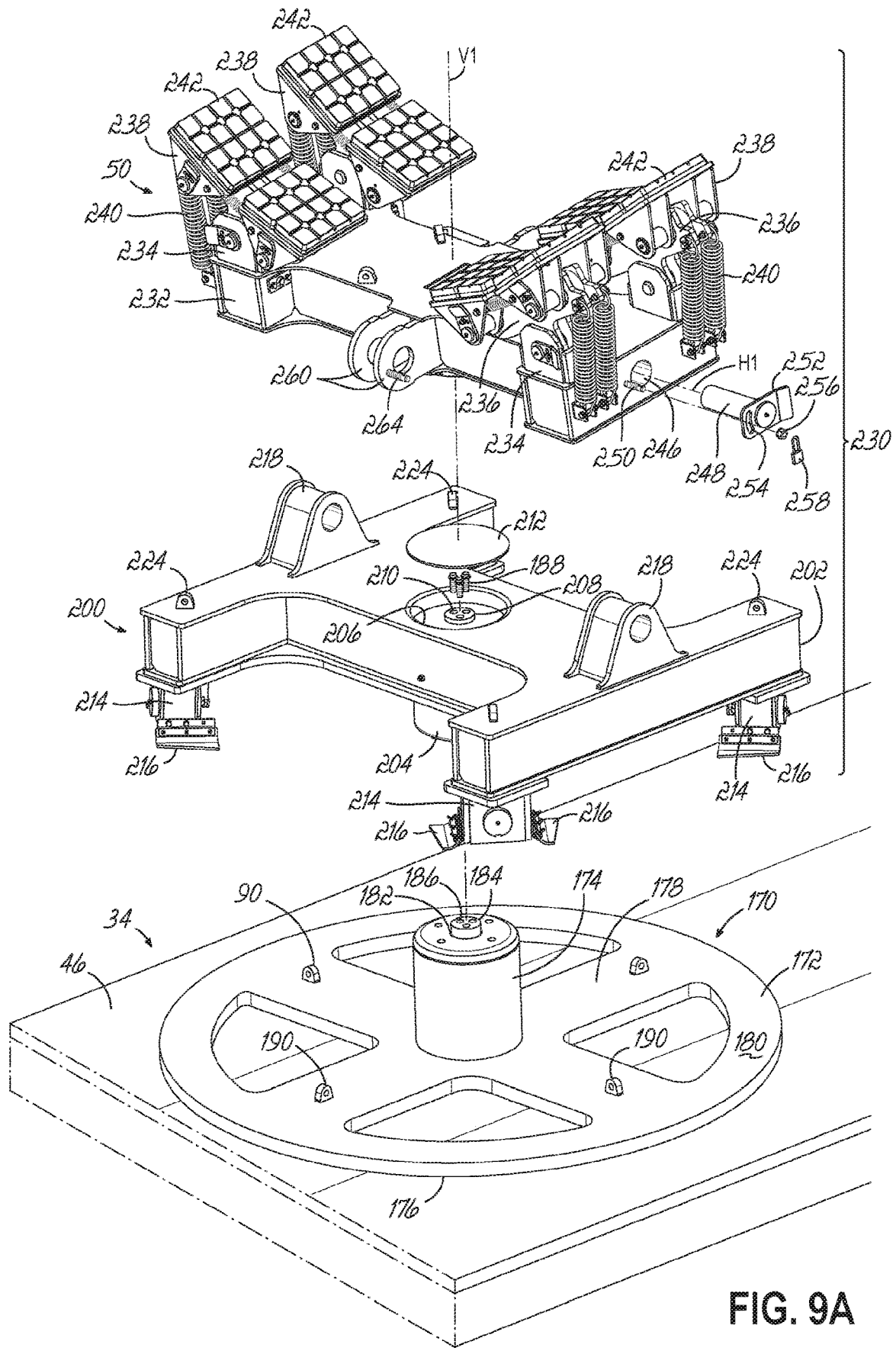
FIG. 9A is a partial disassembled front perspective view of the root bolster of FIG. 9, showing the lower turntable and upper cradle of the root bolster exploded from the root fixture.
Figure 9B:
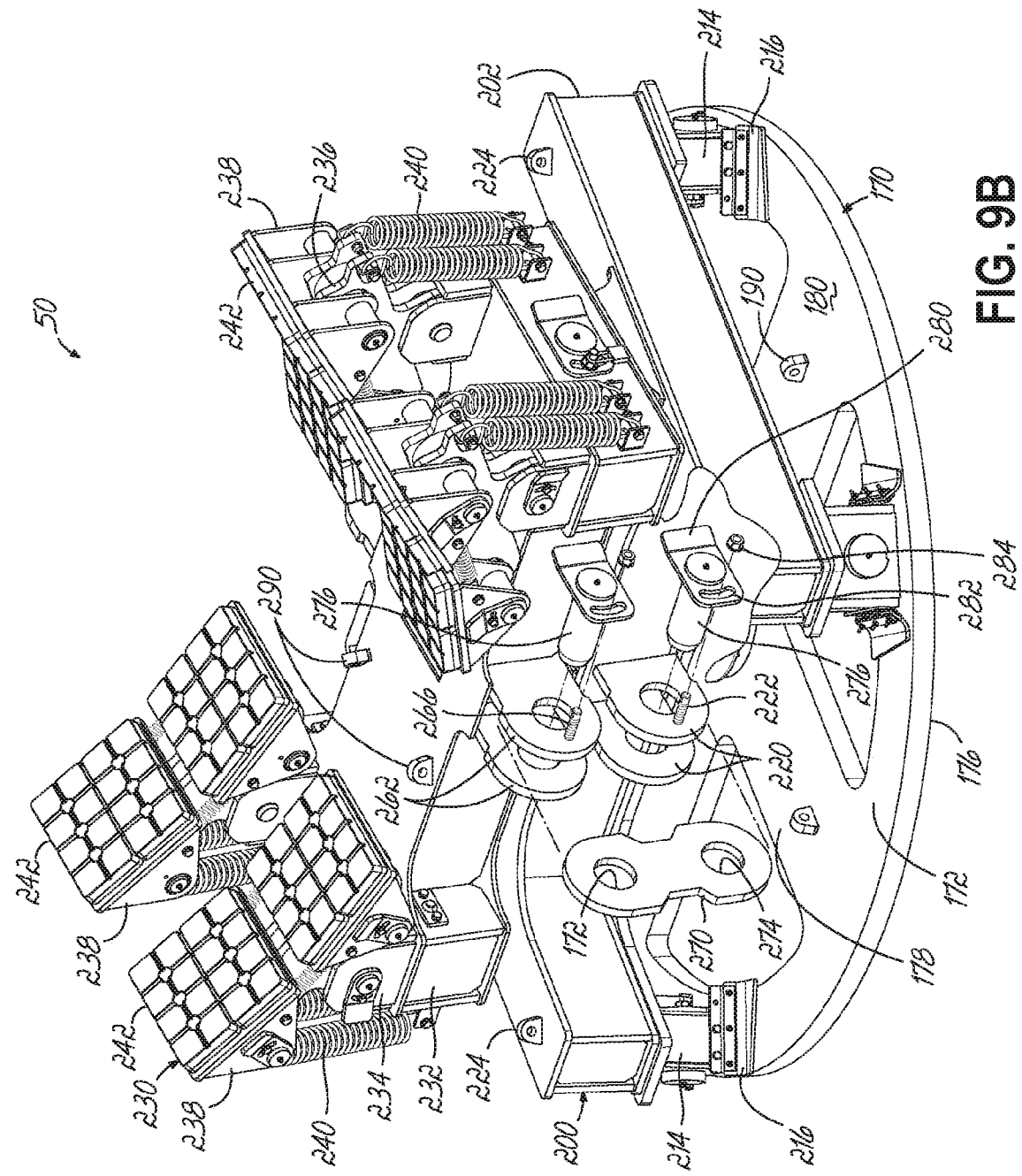
FIG. 9B is a partial disassembled rear perspective view of the root bolster of FIG. 9, showing the angle plate of the root bolster exploded from the lower turntable and upper cradle of the root bolster.
Figure 9C:
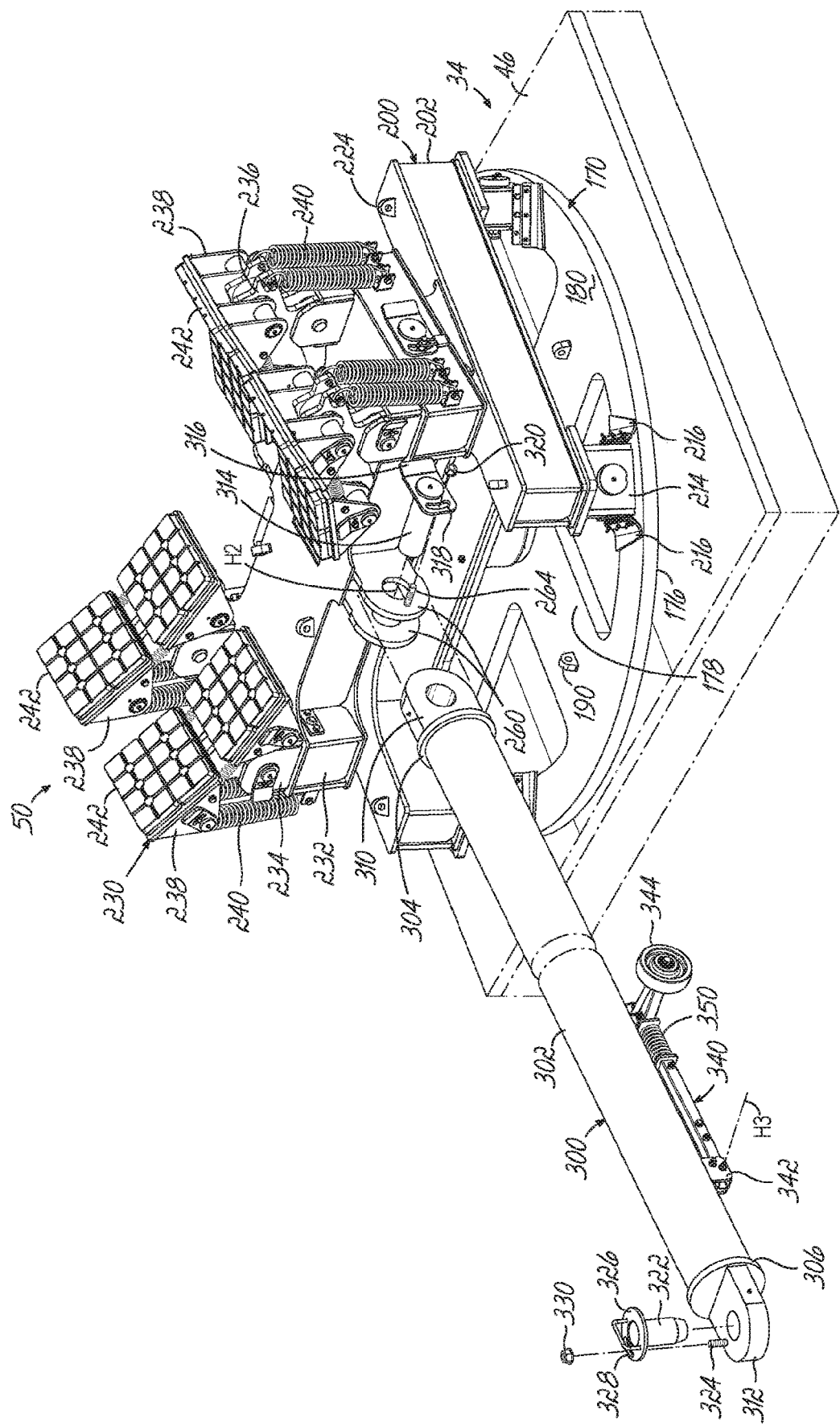
FIG. 9C is a partial disassembled front perspective view of the root bolster of FIG. 9, showing the rigid arm of the root bolster exploded from the upper cradle of the root bolster.

Referring now primarily to FIGS. 9-9C, one exemplary root bolster 50 is shown for mounting and supporting the root end of the blade. The root bolster 50 is movably mounted to a root fixture 170 fixedly coupled to the bed 46 of the underlying trailer 34 against movement relative thereto. As best shown in FIG. 9A, the root fixture 170 includes a base plate 172 and a central shaft 174 extending generally upwardly from the base plate 172. The illustrated base plate 172 has a generally circular peripheral portion 176 and a generally X-shaped central portion 178 for providing rigidity to the base plate 172 and from which the central shaft 174 extends. In one embodiment, the root fixture 170 may be welded to the bed 46 of the trailer 34 along the edges of the X-shaped central portion 178 to fixedly couple the root fixture 170 to the bed 46 of the trailer 34. Alternatively, the root fixture 170 may be fixedly coupled to the bed 46 of the trailer 34 in any other suitable manner. In any event, the generally circular peripheral portion 176 defines an upper bearing surface 180, the purpose of which is described below. In the embodiment shown, the shaft 174 includes a central bore 182 for rotatably receiving a generally cylindrical spindle 184. As shown, the spindle 184 includes a plurality of threaded bores 186 for threadably receiving respective fasteners 188. The illustrated root fixture 170 also includes a plurality of hoist rings 190 positioned on an upper surface of the X-shaped central portion 178 and configured to facilitate hoisting of the root fixture 170 onto the bed 46 of the trailer 34 via a lifting arrangement (not shown), for example.

The illustrated root bolster 50 includes a lower turntable 200 configured to be mounted to the root fixture 170 and pivotable relative thereto about the first vertical axis $V_1$. As best shown in FIG. 9A, the lower turntable 200 has a generally I-shaped frame 202 and a central sleeve 204 extending generally downwardly therefrom and configured to rotatably receive the shaft 174 of the root fixture 170 such that the shaft 174 and the sleeve 204 may collectively define the first vertical axis $V_1$. In the embodiment shown, the lower turntable 200 includes a central recess 206 in the frame 202 generally above and axially aligned with the sleeve 204, and a raised boss 208 centered within the recess 206 and including a plurality of through-bores 210 configured for axial alignment with the threaded bores 186 of the rotatable spindle 184 of the root fixture 170 and for receiving the respective fasteners 188 therethrough to secure the lower turntable 200 to the rotatable spindle 184. As shown, a selectively removable cover 212 may be configured to enclose the recess 206 and conceal the fasteners 188 therein. In the embodiment shown, the lower turntable 200 also includes a plurality of peripheral feet 214 extending generally downwardly from the frame 202 and each having at least one lower bearing pad 216 configured to glide along the circular bearing surface 180 of the root fixture 170 during rotation of the lower turntable 200 relative thereto to assist in supporting the lower turntable 200 on the root fixture 170. The illustrated lower turntable 200 also includes a pair of oppositely disposed support heels 218 positioned on an upper surface of the frame 202, and a pair of lower eyelets 220 (FIG. 9B) positioned on a central side surface of the frame 202, the purposes of which are described below. In the embodiment shown, a threaded shank 222 extends outwardly from the outer side surface of at least one of the pair of lower eyelets 220. The illustrated lower turntable 200 further includes a plurality of hoist rings 224 positioned on an upper surface of the frame 202 and configured to facilitate hoisting of the lower turntable 200 onto the root fixture 170 via a lifting arrangement (not shown), for example.

In the embodiment shown, the root bolster 50 also includes an upper cradle 230 coupled to the lower turntable 200 and fixed against rotation relative to the lower turntable 200 about the first vertical axis $V1$ such that the upper cradle 230 and lower turntable 200 are configured to rotate thereabout together. In the embodiment shown, the upper cradle 230 has a generally I-shaped frame 232 and a plurality of peripheral pivot blocks 234 extending generally upwardly therefrom. As shown, each of the pivot blocks 234 pivotably supports a respective shackle 236, and each shackle 236 pivotably supports a pair of saddles 238 configured to confront the pressure side 250 or the suction side 252 of the blade 24 to be supported by the root bolster 50 at or near the leading edge 146 of the blade 24. In the embodiment shown, the upper cradle 230 also includes a plurality of springs 240 extending between the frame 232 and the shackles 236 for absorbing and damping shock impulses, for example. Each of the saddles 238 includes at least one friction pad 242 configured to frictionally engage the respective side 250, 252 of the blade 24. In this regard, the saddles 238 and/or friction pads 242 may be sized and shaped to conform to the exterior surface of the blade 24. In one embodiment, the friction pads 242 may include a rubber material. The pivotability of the saddles 238 relative to the shackles 236 and of the shackles 236 relative to the pivot blocks 234 may allow the saddles 238 to automatically adjust under the weight of the blade 24 to conform to the exterior surface thereof. In any event, one or more straps, such as webbing straps or cordlash 244 (FIG. 11F), may be configured to circumferentially wrap around the blade 24 and at least a portion of the upper cradle 230 and/or lower turntable 200 to secure the blade 24 against the saddles 238 and to counteract any vertical acceleration forces acting on the blade 24. Such webbing straps may also be used with other bolster elements as illustrated herein, such as in FIG. 4A.

The illustrated upper cradle 230 includes a pair of oppositely disposed support bores 246 positioned on outer side surfaces of the frame 232 and configured for axial alignment with the support heels 218 of the lower turntable 200 and for receiving respective support pins 248 therethrough, such that the upper cradle 230 may be mounted to the lower turntable 200 via the support pins 248, support bores 246, and support heels 218. In the embodiment shown, a threaded shank 250 extends outwardly from the respective outer side surface of the frame 232 proximate each of the support bores 246, and each support pin 248 includes a flange 252 having a curved slot 254 configured to receive the respective threaded shank 250 for limiting relative movement between the frame 232 and the support pin 248. In this regard, a nut 256 may be configured for threadable engagement with each threaded shank 250 to sandwich the flange 252 of the respective support pin 248 between the nut 256 and the frame 232, and a padlock 258 may be inserted through a radial bore (not shown) at or near an outer end of the threaded shank 250 for preventing the nut from becoming inadvertently dislodged from the threaded shank 250.

In the embodiment shown, the upper cradle 230 also includes a first pair of upper eyelets 260 positioned on a central side surface of the frame 232 and a second pair of upper eyelets 262 (FIG. 9B) positioned on an opposite central side surface of the frame 232. A first threaded shank 264 extends outwardly from the outer side surface of at least one of the first pair of upper eyelets 260 and a second threaded shank 266 extends outwardly from the outer side surface of at least one of the second pair of upper eyelets 262.

As best shown in FIG. 9B, the second pair of upper eyelets 262 are configured for vertical alignment with the pair of lower eyelets 220 on the lower turntable 200. In this regard, an angle plate 270 having upper and lower bores 272, 274 may be selectively positioned between the pair of lower eyelets 220 and the second pair of upper eyelets 262 such that the upper and lower bores 272, 274 are axially aligned therewith for receiving respective locking pins 276 therethrough. In this manner, the orientation of the upper cradle 230 relative to the lower turntable 200 about a first horizontal axis H1 collectively defined by the support pins 248, support bores 246, and support heels 218, may be selectively and/or variably fixed. In one embodiment, a variety of angle plates 270 having upper and lower bores 272, 274 spaced apart from each other by various different distances may be provided, so that a particular angle plate 270 may be selected to provide a particular desired fixed orientation of the upper cradle 230 relative to the lower turntable 200. For example, a particular angle plate 270 may correspond to the desired fixed orientation of the upper cradle 230 relative to the lower turntable 200 for accommodating a particular shape or configuration of the blade 24. In the embodiment shown, each locking pin 276 includes a flange 280 having a curved slot 282 configured to receive the respective threaded shank 222, 266 for limiting relative movement between the respective frame 202, 232 and respective locking pin 276. In this regard, a nut 284 may be configured for threadable engagement with each threaded shank 222, 266 to sandwich the flange 280 of the respective locking pin 276 between the nut 284 and the respective eyelet 220, 262. The illustrated upper cradle 230 also includes a plurality of hoist rings 290 positioned on an upper surface of the frame 232 and configured to facilitate hoisting of the upper cradle 230 onto the lower turntable 200 via a lifting arrangement (not shown), for example.

As best shown in FIG. 9C, the illustrated root bolster 50 further includes a rigid arm 300 hingedly coupled to the upper cradle 230 about a second horizontal axis H2 and configured to extend from the upper cradle 230 toward the root end 38 of the blade 24 carried by the root bolster 50. The rigid arm 300 may be fixed against rotation relative to the lower turntable 200 and upper cradle 230 about the first vertical axis V1 such that the rigid arm 300, upper cradle 230, and lower turntable 200 may rotate thereabout together, and the rigid arm 300 may further be selectively fixed against rotation relative to the upper cradle 230 about the second horizontal axis H2.

As shown, the rigid arm 300 includes a generally cylindrical body 302 extending between a proximal end 304 coupled to the upper cradle 230 and a distal end 306 configured to be selectively rigidly coupled to the root end 38 of the blade 24. In one embodiment, the length of the body 302 of the rigid arm 300 may be equal to the first distance D1 between the root end 38 of the blade 24 to be supported by the root bolster 50 and the first vertical axis V1. Thus, the length of the body 302 may be approximately one-tenth of the length L of the blade 24. For example, the length of the body 300 may be between approximately 6 m and approximately 12 m, such as approximately 7 m.

In the embodiment shown, the rigid arm 300 includes a proximal eyelet 310 positioned at or near the proximal end 304 of the cylindrical body 302 and a distal eyelet 312 positioned at or near the distal end 306 of the cylindrical body 302. The proximal eyelet 310 is configured for axial alignment with the first pair of upper eyelets 260 of the upper cradle 230 and for receiving a pivot pin 314 therethrough, such that the pivot pin 314, proximal eyelet 310, and first pair of upper eyelets 260 may collectively define the second horizontal axis H2. In the embodiment shown, the pivot pin 314 includes a flange 316 having a curved slot 318 configured to receive the threaded shank 264 for limiting relative movement between the frame 232 and the pivot pin 314. In this regard, a nut 320 may be configured for threadable engagement with the threaded shank 264 to sandwich the flange 316 of the pivot pin 314 between the nut 320 and the eyelet 260.

In one embodiment, a lock (not shown) may selectively fix the rigid arm 300 against rotation relative to the upper cradle 230 about the second horizontal axis H2. As described in greater detail below, the distal eyelet 312 is configured to selectively receive a locking pin 322 for rigidly coupling the root end 38 of the blade 24 to the distal end 306 of the rigid arm 300. In the embodiment shown, a threaded shank 324 extends outwardly from an upper surface of the distal eyelet 312, and the locking pin 322 includes a flange 326 having a curved slot 328 configured to receive the threaded shank 324 for limiting relative movement between the body 302 of the rigid arm 300 and the locking pin 322. In this regard, a nut 330 may be configured for threadable engagement with the threaded shank 324 to sandwich the flange 326 of the locking pin 322 between the nut 330 and the distal eyelet 312.

Figure 11A:
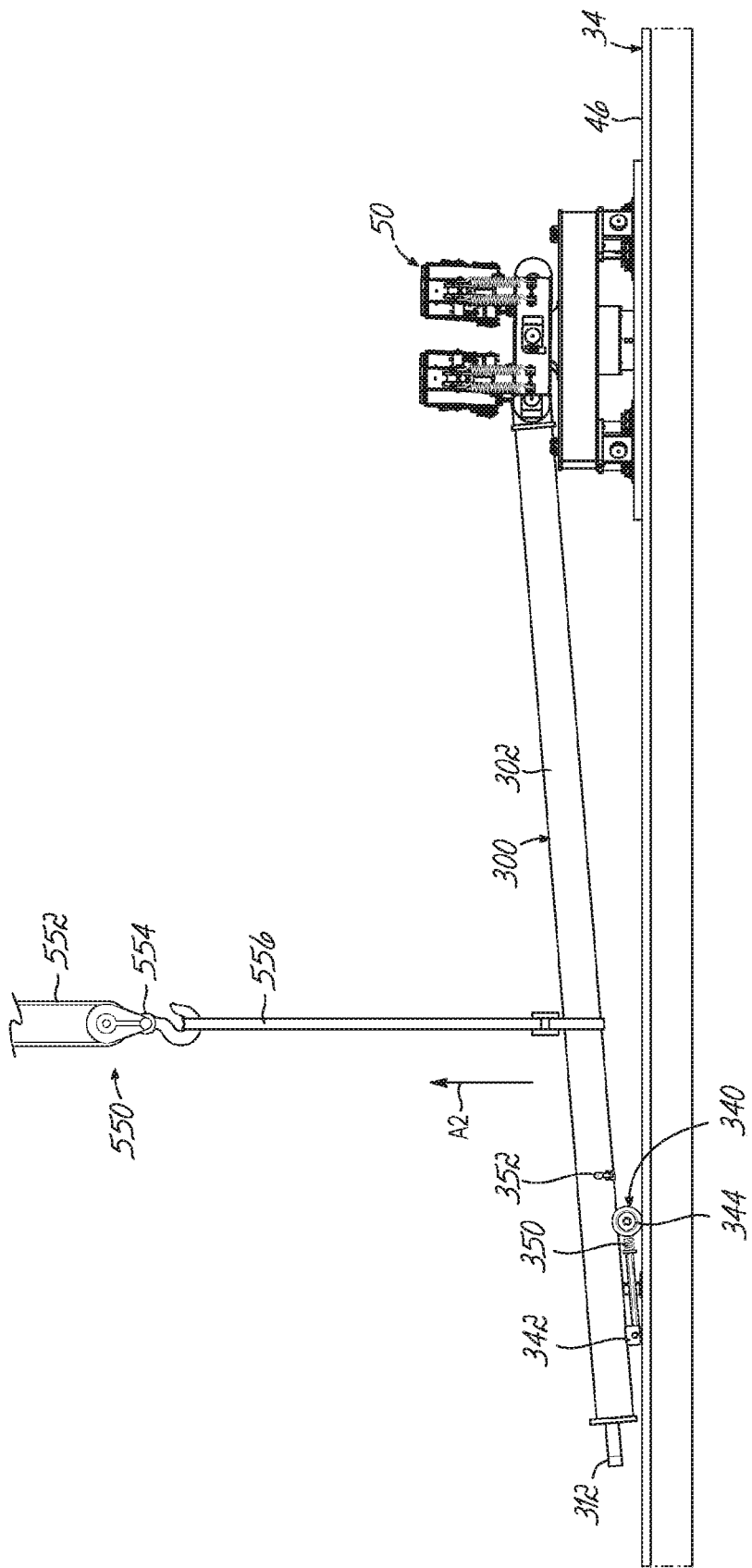
FIGS. 11A-11F are side elevation views of the root bolster illustrating a method of loading the wind turbine blade onto the root bolster.
Figure 11B:
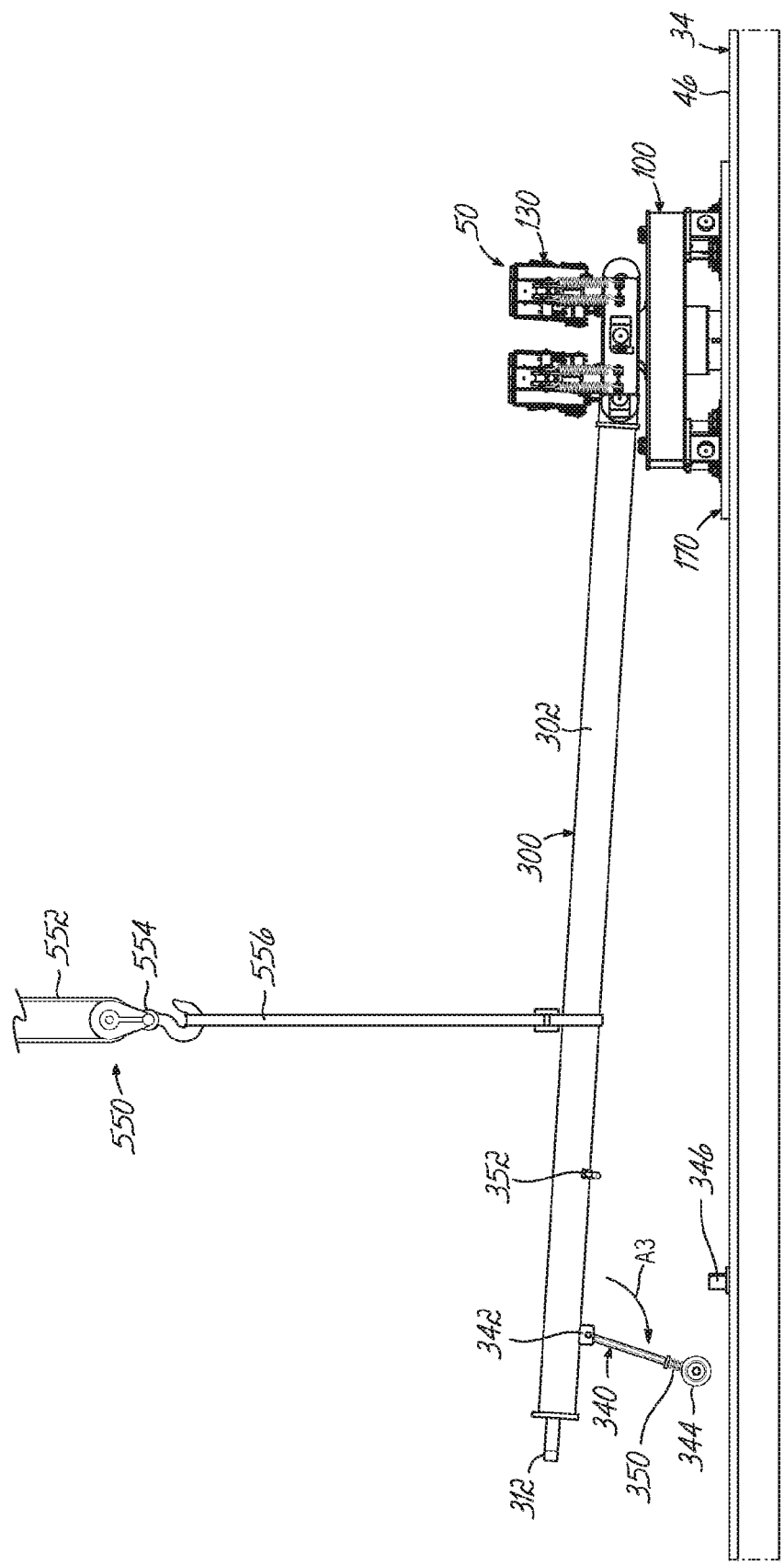

Thus, the rigid arm 300 may be selectively rotatable about the second horizontal axis H2, for example, between a stowed position (FIG. 11A) and at least one deployed position (FIGS. 11B and 11O). When in the stowed position, the body 302 of the rigid arm 300 may be oriented about second horizontal axis H2 to slope downwardly from the proximal end 304 at the upper cradle 230 toward the distal end 306 at or near the bed 46 of the trailer 34. For example, the distal end 306 of the rigid arm 300 may rest on or near the bed 46 of the trailer 34 when in the stowed position. When in the deployed position, the body 302 of the rigid arm 300 may be oriented about the second horizontal axis H2 to be generally horizontal, or to slope upwardly from the proximal end 304 toward the distal end 306, or to slope downwardly from the proximal end 304 toward the distal end 306 less steeply than when in the stowed position. For example, the distal end 306 of the rigid arm 300 may be slightly above, slightly below, or generally level with the proximal end 304 of the rigid arm 300, and may be supported above the bed 46 of the trailer 34, when in a deployed position. In one embodiment, the body 302 of the rigid arm 300 may be cantilevered over the bed 46 of the trailer 34 from the proximal end 304 of the rigid arm 300 by selectively fixing the rigid arm 300 against rotation relative to the upper cradle 230 about the second horizontal axis H2 when in a deployed position. In another embodiment, the body 302 of the rigid arm 300 may be supported above the bed 46 of the trailer 34 at or near both the proximal and distal ends 304, 306, such as via the upper cradle 230 at the proximal end 304 and via a temporary support structure positioned below the distal end 306, when in a deployed position.

In this regard, the illustrated root bolster 50 also includes an articulating leg 340 hingedly coupled to the body 302 of the rigid arm 300 at or near the distal end 306 thereof and, more particularly, at a joint 342 defining a third horizontal axis H3 such that the articulating leg 340 is rotatable relative to the rigid arm 300 about the third horizontal axis H3 between a retracted position (FIG. 11A) in which the articulating leg 340 is longitudinally aligned with and tucked against the rigid arm 300, and at least one extended position (FIGS. 11B and 11O) in which the articulating leg 340 extends generally downwardly from the rigid arm 300 toward the bed 46 of the trailer 34. The illustrated articulating leg 340 includes a pair of wheels 344 located opposite the joint 342 for movably supporting the articulating leg 340 on the bed 46 of the trailer 34. In the embodiment shown, a laterally-extending barrier 346 (FIG. 9) is provided on the bed 46 of the trailer 34 and is spaced apart from the root fixture 170 for selectively abutting the wheels 344 of the articulating leg 340 to assist in maintaining the articulating leg 340 in an extended position, as described in greater detail below. In one embodiment, the barrier 346 may be welded to the bed 46 of the trailer 34 to fixedly couple the barrier 346 to the bed 46 of the trailer 34. Alternatively, the barrier 346 may be fixedly coupled to the bed 46 of the trailer 34 in any other suitable manner. The illustrated articulating leg 340 also includes at least one spring 350 between the wheels 344 and the joint 342 for absorbing and damping shock impulses, for example.

While not shown, a locking mechanism may be configured to selectively lock the articulating leg 340 in at least the retracted position. For example, such a locking mechanism may include a pair of magnets, one of which is fixedly coupled to the articulating leg 340 at a position spaced apart from the joint 342 and the other of which is fixedly coupled to the body 302 of the rigid arm 300 for magnetic engagement therebetween when the articulating leg 340 is in or near the retracted position. The magnetic attraction between the magnets may be sufficient to securely retain the articulating leg 340 in the retracted position. In the embodiment shown, an on/off lever 352 (FIG. 11A) is configured to be movable between an "off" position in which the lever 352 causes a shield (not shown) to cover at least one of the magnets thereby interrupting the magnetic attraction between the magnets, and an "on" position in which the lever causes the shield to uncover the at least one of the magnets. Thus, the articulating leg 340 may be secured in the retracted position when the magnets are magnetically engaged with the lever 352 in the "on" position, and may be moved away from the retracted position toward the at least one extended position when the magnets are magnetically disengaged with the lever 352 in the "off" position. It will be appreciated that the locking mechanism may be configured in any other suitable manner for selectively locking the articulating leg 340 in at least the retracted position.

In one embodiment, the distal end 306 of the rigid arm 300 is configured to be rigidly coupled to the root end 38 of the blade 24 when the rigid arm 300 is in the deployed position. For example, the distal end 306 of the rigid arm 300 may be configured to be initially rigidly coupled to the root end 38 of the blade 24 when the rigid arm 300 is in the deployed position and when the distal end 306 of the rigid arm 300 is supported above the bed 46 of the trailer 34 by the extended articulating leg 340, and may be configured to remain rigidly coupled to the root end 38 of the blade 24 when the articulating leg 340 is subsequently moved to the retracted position, as described in greater detail below.

In this manner, the rigid arm 300 may be capable of providing a linkage between the root end 38 of the blade 24 and the upper cradle 230 of the root bolster 50 and may thereby assist in transmitting longitudinal acceleration and/or deceleration forces between the root end 38 of the blade 24 and the root fixture 170. By rotating about the first vertical axis V1 along with the upper cradle 230 and lower turntable 200 of the root bolster 50, the rigid arm 300 may remain longitudinally aligned with the blade 24 and may assist in allowing the root end 38 of the blade 24 to swing out over and beyond the edge of the trailer 34, such as while rounding a curved section of the roadway. In this regard, the blade 24 may be rested on the saddles 238 of the root bolster 50 at a position inboard of the root end 38 by approximately the same length as the length of the rigid arm 300, and may be rigidly coupled to the distal end 306 of the rigid arm 300 at the root end 38, as described in greater detail below.

Figure 10:
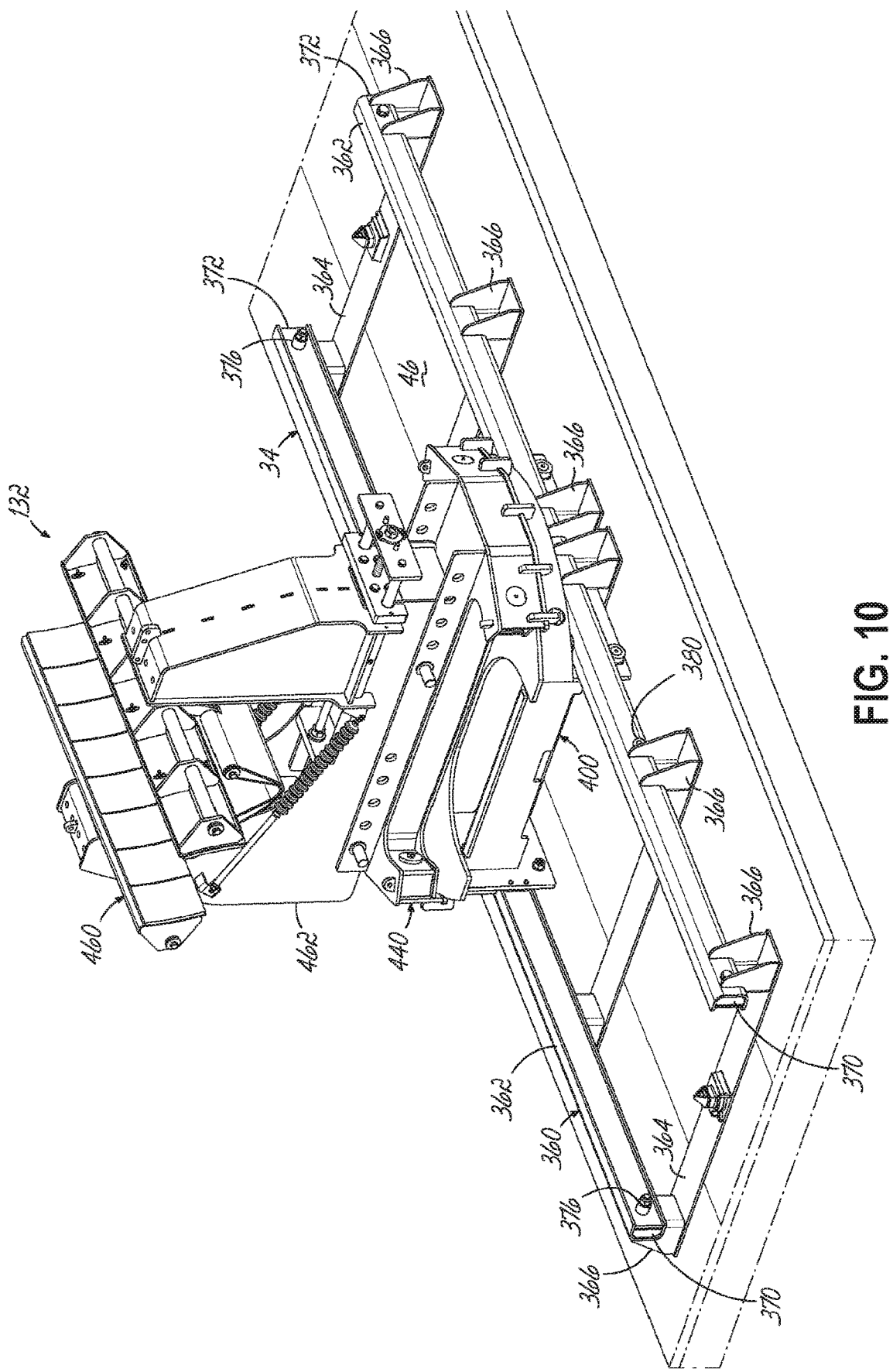
FIG. 10 is a front perspective view of the tip bolster of FIG. 4 pivotably mounted to a tip fixture fixed to the bed of a separate dolly vehicle in an embodiment of the invention.
Figure 10A:
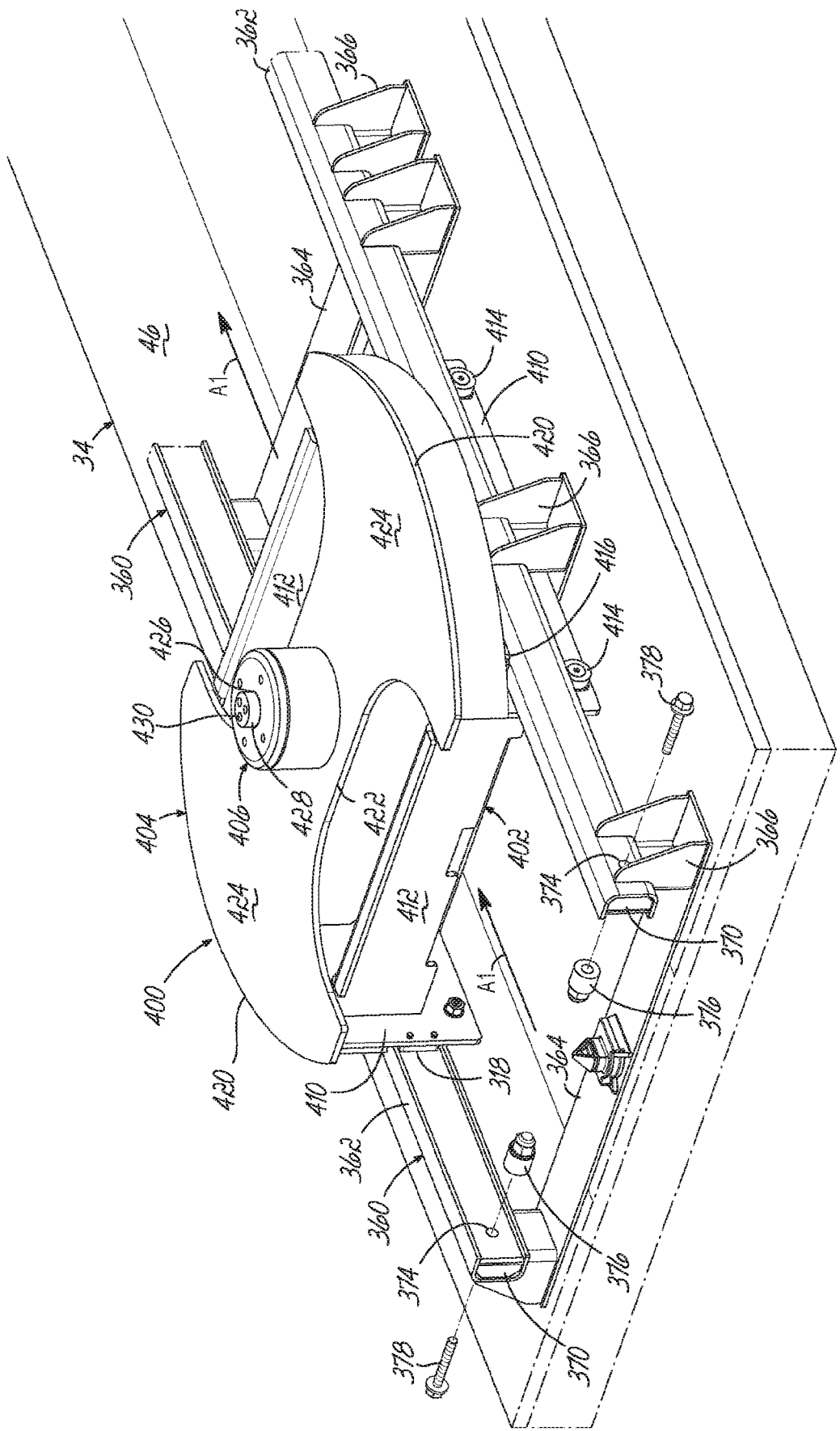
FIG. 10A is a partial disassembled front perspective view of the tip bolster of FIG. 10, showing the lower carriage of the root bolster being translatably mounted to the rails of the tip fixture.
Figure 10B:
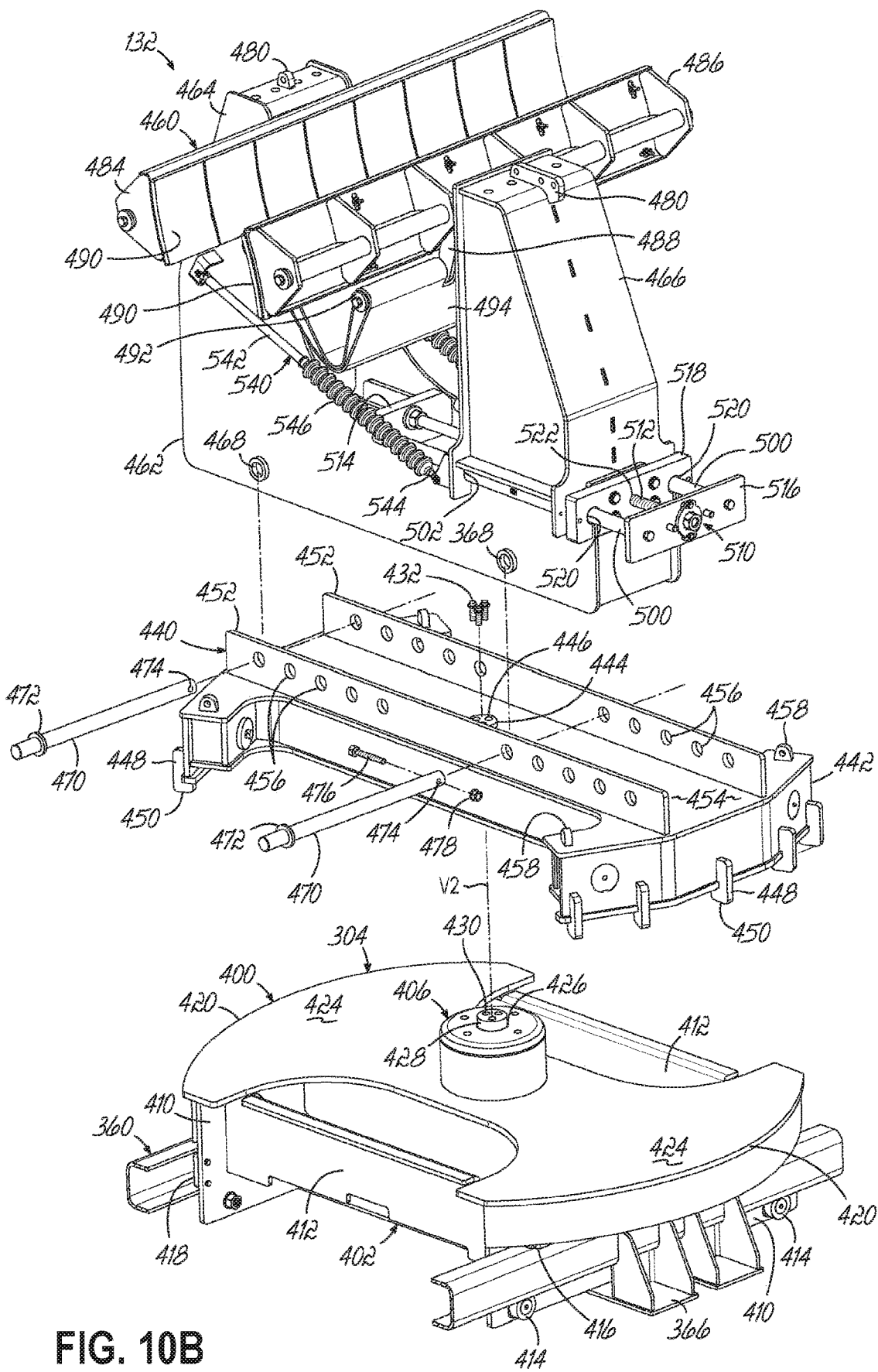
FIG. 10B is a partial disassembled front perspective view of the tip bolster of FIG. 10, showing the intermediate turntable and upper clamp of the tip bolster exploded from the lower carriage of the tip bolster.

A separate tip bolster structure might be utilized for the tip bolster due to the different profile in the tip of a blade. Referring now primarily to FIGS. 10-10B, the illustrated tip bolster 52 is movably mounted to a tip fixture 360 fixedly coupled to the bed 46 of the underlying trailer 34 against movement relative thereto. As shown, the tip fixture 360 includes a pair of longitudinally extending rails 362 spaced apart from and rigidly coupled to each other by a plurality of laterally extending ties 364 and corresponding brackets 366. In the embodiment shown, the rails 362 each extend along the bed 46 of the trailer 34 between first and second ends 370, 372, and are elevated above the bed 46 of the trailer 34 by the brackets 366. As shown in FIG. 10A, a through-bore 374 is positioned at or near each of the ends 370, 372 of the rails 362 and a laterally-inwardly extending stopper 376 is aligned therewith and removably coupled to the respective rail 362 via a corresponding fastener 378 extending therethrough for limiting translational movement of the tip bolster 52 along the rails 362, as described in greater detail below. In one embodiment, the tip fixture 360 may be welded to the bed 46 of the trailer 34 along the edges of the ties 364 to fixedly couple the tip fixture 360 to the bed 46 of the trailer 34. Alternatively, the tip fixture 360 may be fixedly coupled to the bed 46 of the trailer 34 in any other suitable manner. The illustrated tip fixture 360 also includes a plurality of hoist grommets 380 (FIG. 10) positioned on outer side surfaces of the rails 362 and configured to facilitate hoisting of the tip fixture 360 onto the bed 46 of the trailer 34 via a lifting arrangement (not shown), for example.

As best shown in FIGS. 10A and 10B, the illustrated tip bolster 52 includes a lower carriage 400 configured to be mounted to the tip fixture 360 and longitudinally translatable relative thereto along the rails 362. In the embodiment shown, the lower carriage 400 includes a chassis 402 carrying a platform 404, and a central shaft 406 extending generally upwardly from the platform 404. As shown, the chassis 402 has a pair of longitudinally extending sidewalls 410 spaced apart from and rigidly coupled to each other by a pair of laterally extending cross supports 412. Each of the sidewalls 410 includes a pair of laterally-outwardly extending lower rollers 414 and a corresponding pair of laterally-outwardly extending upper sliders 416 vertically aligned therewith, such that each set of vertically-aligned rollers 414 and sliders 416 may be configured to capture a respective one of the rails 362 therebetween for translatably securing the lower carriage 400, and thus the tip bolster 52, to the tip fixture 360. In the embodiment shown, a laterally-outwardly extending bumper 418 is positioned between each set of vertically-aligned rollers 414 and sliders 416 and is configured to selectively abut the respective stopper 376 of the corresponding rail 362 to limit translational movement of the tip bolster 52 along the rails 362 between the first and second ends 370, 372 thereof and thereby prevent the tip bolster 52 from becoming inadvertently dislodged from the tip fixture 360. The stoppers 376 may be selectively removable from the respective rails 362 for allowing initial mounting of the lower carriage 400 to the tip fixture 360, as indicated by the arrows A1 in FIG. 10A, or subsequent dismounting of the lower carriage 400 from the tip fixture 360.

In the embodiment shown, the platform 404 has a pair of lateral generally circular arc-shaped peripheral portions 420 and a generally I-shaped central portion 422 for providing rigidity to the platform 404 and from which the central shaft 406 extends. The generally circular arc-shaped peripheral portions 420 define respective upper bearing surfaces 424, the purpose of which is described below. In the embodiment shown, the shaft 406 includes a central bore 426 for rotatably receiving a generally cylindrical spindle 428. As shown, the spindle 428 includes a plurality of threaded bores 430 for threadably receiving respective fasteners 432 (FIG. 10B). The lower carriage 400 may also include a plurality of hoist rings (not shown) positioned on the outer side surfaces of the generally arc-shaped peripheral portions 420 and configured to facilitate hoisting of the lower carriage 400 onto the tip fixture 360 via a lifting arrangement (not shown), for example.

The illustrated tip bolster 52 also includes an intermediate turntable 440 pivotably coupled to the lower carriage 400 about the second vertical axis $V_2$ and fixed against linear movement relative to the lower carriage 400, such that the intermediate turntable 440 and lower carriage 400 are configured to translate along the rails 362 together. In the embodiment shown, the intermediate turntable 440 has a generally I-shaped frame 442 and may include a central bore (not shown) on a lower side thereof configured to rotatably receive the shaft 406 of the lower carriage 400 such that the bore and the shaft 406 may collectively define the second vertical axis $V_2$. As best shown in FIG. 10B, the intermediate turntable 440 includes a central raised boss 444 extending upwardly from the frame 442 and including a plurality of through-bores 446 configured for axial alignment with the threaded bores 430 of the rotatable spindle 428 of the lower carriage 400 and for receiving the respective fasteners 432 therethrough to secure the intermediate turntable 440 to the rotatable spindle 428. In the embodiment shown, the intermediate turntable 440 also includes a plurality of peripheral feet 448 extending generally downwardly from the frame 442 and each having a lower bearing surface 450 configured to glide along the respective circular arc-shaped bearing surface 424 of the lower carriage 400 during rotation of the intermediate turntable 440 relative thereto to assist in supporting the intermediate turntable 440 on the lower carriage 400. The illustrated intermediate turntable 440 also includes a pair of flanges 452 extending generally upwardly from the frame 442 and spaced apart from each other to define a channel 454 therebetween. As shown, each flange 452 includes a plurality of holes 456 arranged such that each hole 456 in one of the flanges 452 is axially aligned with a corresponding hole 456 in the other of the flanges 452. The illustrated intermediate turntable 440 also includes a plurality of hoist rings 458 positioned on an upper surface of the frame 442 and configured to facilitate hoisting of the intermediate turntable 440 onto the lower carriage 400 via a lifting arrangement (not shown), for example.

In the embodiment shown, the tip bolster 52 also includes an upper clamp 460 selectively fixed against movement relative to the intermediate turntable 440 such that the upper clamp 460 and intermediate turntable 440 are configured to rotate together about the second vertical axis $V_2$, and such that the upper clamp 460, intermediate turntable 440, and lower carriage 400 are configured to translate together along the rails 362. As shown, the upper clamp 460 includes a clamp frame 462, as well as first and second clamp arms 464, 466 selectively movable relative to each other in a clamping direction. In the embodiment shown, the first clamp arm 464 is configured to be stationary relative to the clamp frame 462, and the second clamp arm 466 is configured to be movable relative to the clamp frame 462 toward and away from the first clamp arm 464 in the clamping direction. In this regard, the illustrated first clamp arm 464 is integrally formed together with the clamp frame 462 as a unitary piece. The illustrated clamp frame 462 is sized and configured to be partially received within the channel 454 of the intermediate turntable 440, and includes a pair of lower bores 468 configured for axial alignment with a selected set of holes 456 in the flanges 452 of the intermediate turntable 440 and for receiving respective locking rods 470 therethrough. In this manner, the position of the clamp frame 462 relative to the intermediate turntable 440 may be selectively fixed. The various sets of holes 456 in the flanges 452 available for alignment with the lower bores 468 of the clamp frame 462 may allow the particular position of the clamp frame 462 within the channel 454 to be adjusted as desired. In the embodiment shown, each locking rod 470 includes a flange 472 at or near one end thereof and a radial bore 474 for receiving a threaded fastener 476 at or near the other end thereof, the threaded fastener 476 being configured to threadably engage a nut 478 for selectively capturing the flanges 452 of the intermediate turntable 440 between the flange 472 of the locking rod 470 and the fastener 476 and accompanying nut 478. The illustrated upper clamp 460 also includes a plurality of hoist rings 480 positioned on upper surfaces of the clamp arms 464, 466 and configured to facilitate hoisting of the upper clamp 460 onto the intermediate turntable 440 via a lifting arrangement (not shown), for example.

The illustrated upper clamp 460 has upper pivot blocks 482 (FIG. 12A) extending generally inwardly from each of the clamp arms 464, 466. As shown, each of the pivot blocks 482 pivotably supports at least one respective jaw 484, 486 configured to confront the pressure side 50 or the suction side 52 of the blade 24 at or near the leading edge 146 of the blade 24, and further pivotably supports at least one respective saddle arm 488. Since the first clamp arm 464 is configured to be stationary relative to the clamp frame 462 and the second clamp arm 466 is configured to be movable relative to the clamp frame 462, the jaw 484 of the first clamp arm 464 may be considered "stationary" and the jaw 486 of the second clamp arm 466 may be considered "movable." In any event, each of the jaws 484, 486 includes at least one friction pad 490 configured to frictionally engage the respective sides 50, 52 of the blade 24. In this regard, the jaws 484, 486 and/or friction pads 490 may be sized and shaped to conform to the exterior surface of the blade 24. In one embodiment, the friction pads 490 may include a rubber material. In the embodiment shown, each of the saddle arms 488 carries a respective saddle bar 492, and a pliable saddle 494 configured to confront the leading edge 146 of the blade 24 extends loosely between the saddle bars 492 of the first and second clamp arms 464, 466. In this regard, the pliable saddle 494 may be configured as an endless loop of material wrapped about the saddle bars 492. In one embodiment, each saddle arm 488 and accompanying saddle bar 492 may be rigidly coupled to the respective jaw 484, 486 so as to pivot relative to the corresponding clamp arm 464, 466 therewith. In this manner, the pliable saddle 494 may be configured to allow the blade 24 to rotate slightly about the longitudinal axis of the blade 24 to mechanical equilibrium (which may include leaning against one of the jaws 484, 486, for example) as the weight of the blade 24 is transferred to the pliable saddle 494 during lowering of the blade 24 onto the tip bolster 52, and may further be configured to tilt one or both of the jaws 484, 486 toward the exterior surface of the blade 24 during such lowering of the blade 24. Thus, the pliable saddle 494 may provide some flexibility to the positioning of the blade 24 between the jaws 484, 486. The pivotability of the jaws 484, 486 relative to the pivot blocks 482 and the pliability of the saddle 494 may allow the jaws 484, 486 and/or saddle 494 to automatically adjust under the weight of the blade 24 to conform to the exterior surface thereof.

In the embodiment shown, the upper clamp 460 further includes a pair of peripheral guide rods 500 extending parallel to the clamping direction and fixedly coupled to the clamp frame 462 against movement relative thereto. The second clamp arm 466 includes two corresponding pairs of lower notches 502 configured to slidably receive the pair of guide rods 500 such that the second clamp arm 466 may be movable toward (e.g., forward) and away from (e.g., backward) the first clamp arm 464 along the pair of guide rods 500 for moving the movable jaw 486 toward and away from the stationary jaw 484 to apply and release a clamping force and/or clamping pressure to/from the blade 24 interposed therebetween and resting on the saddle 494. For example, the movable jaw 486 may be moved into contact with the blade 24 to press the blade 24 against the stationary jaw 484 for generating such a clamping force and/or clamping pressure.

The illustrated upper clamp 460 also includes an actuator 510 configured to effect forward and backward movement of the second clamp arm 466 along the pair of guide rods 500. As shown, the actuator 510 includes a rotatable drive screw 512 extending parallel to the clamping direction, horizontally aligned with and equally spaced between the pair of guide rods 500, and fixed against movement relative to the clamp frame 462 parallel to the clamping direction. In this regard, the drive screw 512 is rotatably supported by a first end plate 514 fixedly coupled directly to the clamp frame 462 generally between the first and second clamp arms 464, 466, and by a second end plate 516 fixedly coupled to the clamp frame 462 via the pair of guide rods 500 on a side of the second clamp arm 466 generally opposite from the first clamp arm 464. The actuator 510 further includes a drive plate 518 having a pair of outer through-bores 520 configured to slidably receive the pair of guide rods 500 such that the drive plate 518 may be movable along the pair of guide rods 500.

As shown, the drive plate 518 also includes a central threaded bore 522 configured to threadably receive the drive screw 512, such that rotation of the drive screw 512 may effect forward or backward movement of the drive plate 518 along the guide rods 500. For example, clockwise rotation of the drive screw 512 may effect forward movement of the drive plate 518 along the guide rods 500 to urge the second clamp arm 466 forward for applying a clamping force and/or clamping pressure to the blade 24 via the jaws 484, 486 (including the pads 490), while counterclockwise rotation of the drive screw 512 may effect backward movement of the drive plate 518 along the guide rods 500 to allow the second clamp arm 466 to be moved backward for releasing the blade 24 from the jaws 484, 486. The drive plate 518 may be selectively fixed at a particular location along the guide rods 500 when the drive screw 512 is rotationally stationary, such as when a desired clamping force and/or clamping pressure on the blade 24 has been achieved, as described in greater detail below. In one embodiment, the drive screw 512 may be operatively coupled to a motor (not shown) for automatically rotating the drive screw 512 in the clockwise and/or counterclockwise direction.

In the embodiment shown, the actuator 510 further includes a pair of mechanical energy storage devices in the form of coil springs 530 (FIGS. 12A and 12A) positioned about the pair of guide rods 500 between the drive plate 518 and the second clamp arm 466 and configured to selectively store and release energy between the drive plate 518 and the second clamp arm 466, thereby providing some flexibility to the actuator 510 for responding to unexpected decreases in the clamping force and/or clamping pressure being applied to the blade 24 by the jaws 484, 486.

In this regard, the illustrated springs 530 are each configured to transmit the forward linear movement of the drive plate 518 along the guide rods 500 to the second clamp arm 466 for urging the second clamp arm 466 forward until the movable jaw 486 presses the blade 24 against the stationary jaw 484 and further forward movement of the second clamp arm 466 is generally resisted by the blade 24. The springs 530 are each further configured to be compressed or "preloaded" by the drive plate 518 as the drive plate 518 continues to move forward along the guide rods 500 after the movable jaw 486 presses the blade 24 against the stationary jaw 484. In this manner, the springs 530 may assist in preventing such continued forward movement of the drive plate 518 from further urging the second clamp arm 466 forward which could otherwise result in an excessive, potentially damaging clamping force and/or clamping pressure being applied to the blade 24. Moreover, the compressed or pre-loaded springs 530 may be capable of expanding in response to an unexpected decrease or loss of contact between the movable jaw 486 and the blade 24, and such expansion of the springs 530 may urge the second clamp arm 466 further forward to cause the movable jaw 486 to advance toward the stationary jaw 484 and thereby increase the clamping force and/or clamping pressure applied to the blade 24. Thus, the springs 530 may automatically compensate for undesirable decreases or losses of contact between the jaws 484, 486 and the blade 24, and may thereby assist in maintaining a substantially continuous desired clamping force and/or clamping pressure on the blade 24.

In this manner, the first and second clamp arms 464, 466 may be configured to be urged relatively toward each other in response to a decrease in the clamping force and/or clamping pressure applied to the blade 24. It will be appreciated that such decreases may occur in a variety of contexts. For example, a decrease in the clamping force applied to the blade 24 may result from vibrations and shocks during transportation. Likewise, the blade 24 may creep, drift, or otherwise begin to slip longitudinally such that the blade 24 subsequently presents a more slender portion between the jaws 484, 486, which may cause a decrease in the clamping pressure applied between the jaws 484, 486 and the blade 24. In any event, such a decrease in the applied clamping force and/or clamping pressure may only be momentary, as the springs 530 may urge the first and second clamp arms 464, 466 relatively toward each other in response to such a decrease to further close the upper clamp 460 and re-establish the previously applied clamping force and/or clamping pressure on the blade 24.

In one embodiment, the drive screw 512 may be configured to effect forward linear movement of the drive plate 518 until a desired amount of clamping force and/or clamping pressure is applied by the jaws 484, 486 to the blade 24, and/or until a desired amount of compression or pre-loading of the springs 530 has been achieved. In this regard, the amount of compression of the springs 530 and the amount of clamping force and/or clamping pressure applied to the blade 24 each correspond to the distance between the drive plate 518 and the second clamp arm 466. Thus, the drive screw 512 may be configured to position the drive plate 518 at a particular location along the guide rods 500 corresponding to the desired amount of clamping force/pressure and/or pre-loading. In one embodiment, the guide rods 500 may include indicia (not shown) for providing a visual indication of such a particular location to an operator of the tip bolster 52 or other personnel.

While the energy storage devices of this embodiment are illustrated as a pair of coil springs 530, any other suitable energy storage devices, such as one or more hydraulic accumulators, may be used to selectively store and release energy between the drive plate 518 and the second clamp arm 466 in response to the applied clamping force and/or clamping pressure falling below the desired amount.

In the embodiment shown, the upper clamp 460 further includes a pair of spring-loaded separators 540 extending between the first and second clamp arms 464, 466 for biasing the second clamp arm 466 away from the first clamp arm 464 in the clamping direction. Each of the illustrated spring-loaded separators 540 is telescopic and includes at least one outer tuber 542 and at least one inner tube 544 biased axially away from each other by an internal biasing member, such as a coil spring or a hydraulic accumulator (not shown), for example, as well as a protective gasket 546 positioned about the interface between the outer and inner tubes 542, 544 for preventing dirt or other debris from collecting therebetween. The spring-loaded separators 540 may be configured to urge the second clamp arm 466 backward for releasing the blade 24 from the jaws 484, 486, such as when the drive screw 512 is rotated to move the drive plate 518 backward along the guide rods 500 allowing the springs 530 to expand in a backward direction and thereby remove any force applied to the second clamp arm 466 by the springs 530. In this manner, the spring-loaded separators 540 may automatically cause the blade 24 to be released from the jaws 484, 486 when the force applied to the second clamp arm 466 by the springs 530 is removed by retracting the drive plate 518 backward along the guide rods 500, without requiring intervention of an operator or other personnel to push the second clamp arm 466 backward.

Thus, the upper clamp 460 may be capable of applying a substantially continuous clamping force and/or clamping pressure to the blade 24 and may thereby assist in transmitting longitudinal acceleration and/or deceleration forces between the tip region 29 of the blade 24 and the tip fixture 360, as well as counteracting any vertical acceleration forces acting on the blade 24. By being longitudinally translatable along the rails 362, the lower carriage 400 may compensate for changes in the profile of the transportation arrangement, such as while rounding a curved section of the roadway.

While tip bolster 52 is illustrated in some detail, other appropriate tip bolsters, such as bolster structure 52a might be implemented as shown in FIG. 4A. As such, the invention is not limited to the specific bolster structures that might be used for securing the blade in the transportation arrangement of the invention.

Figure 11C:
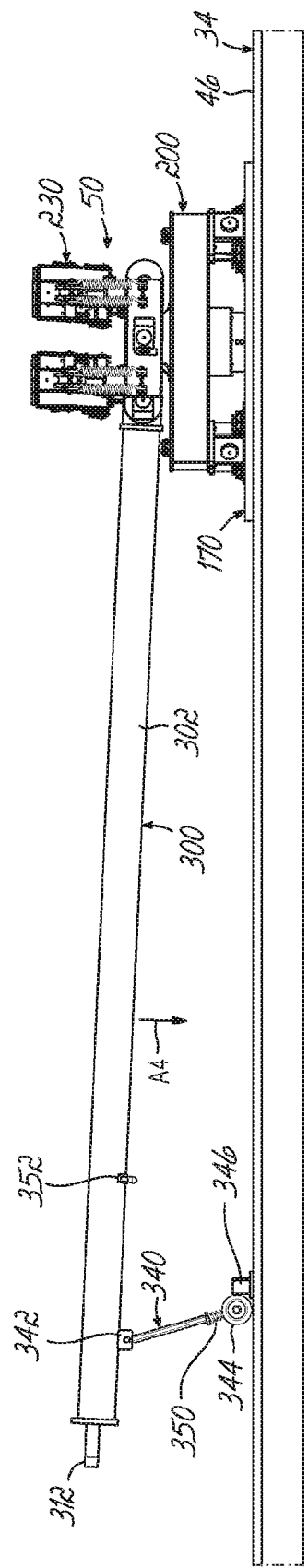
Figure 11D:
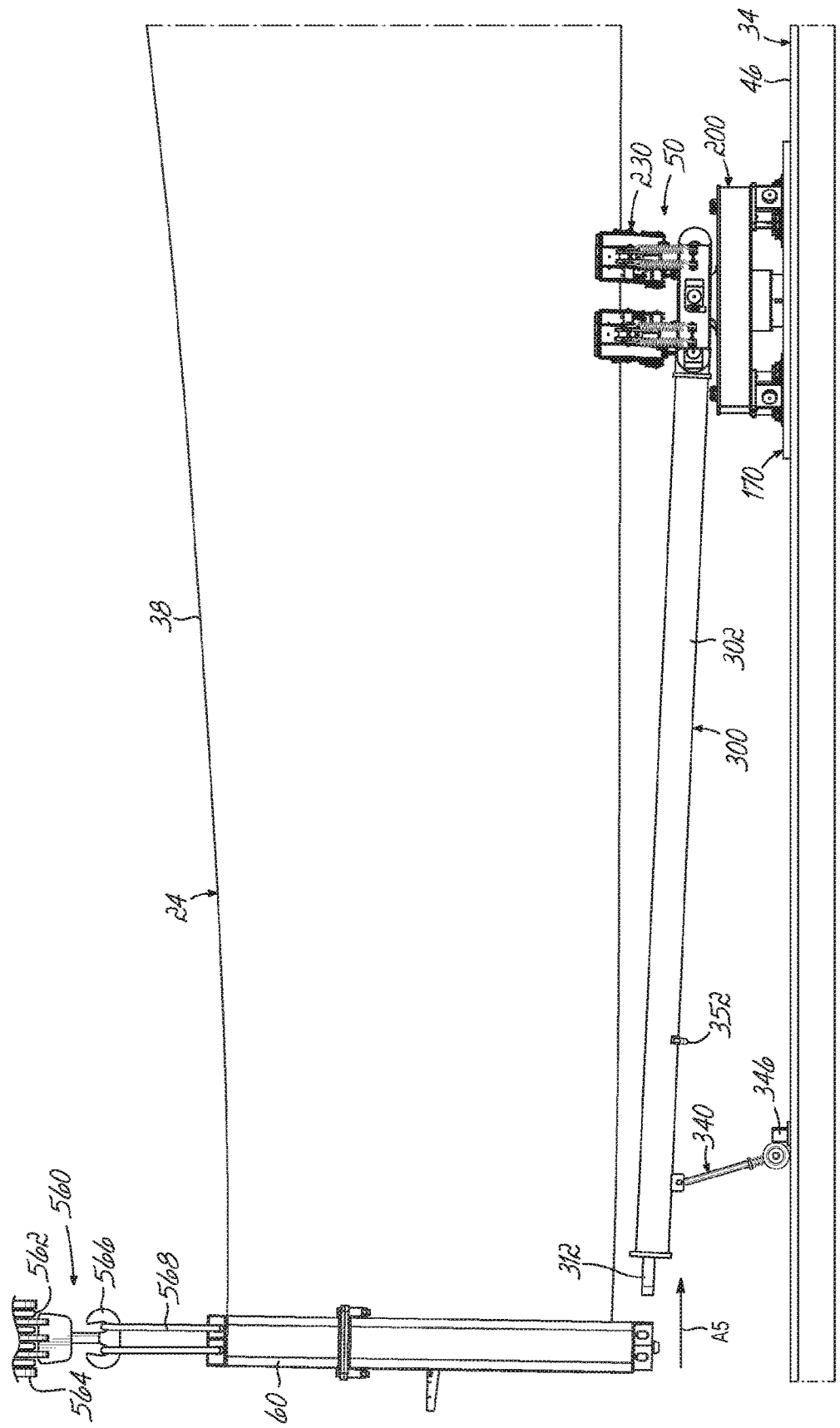
Figure 11E:
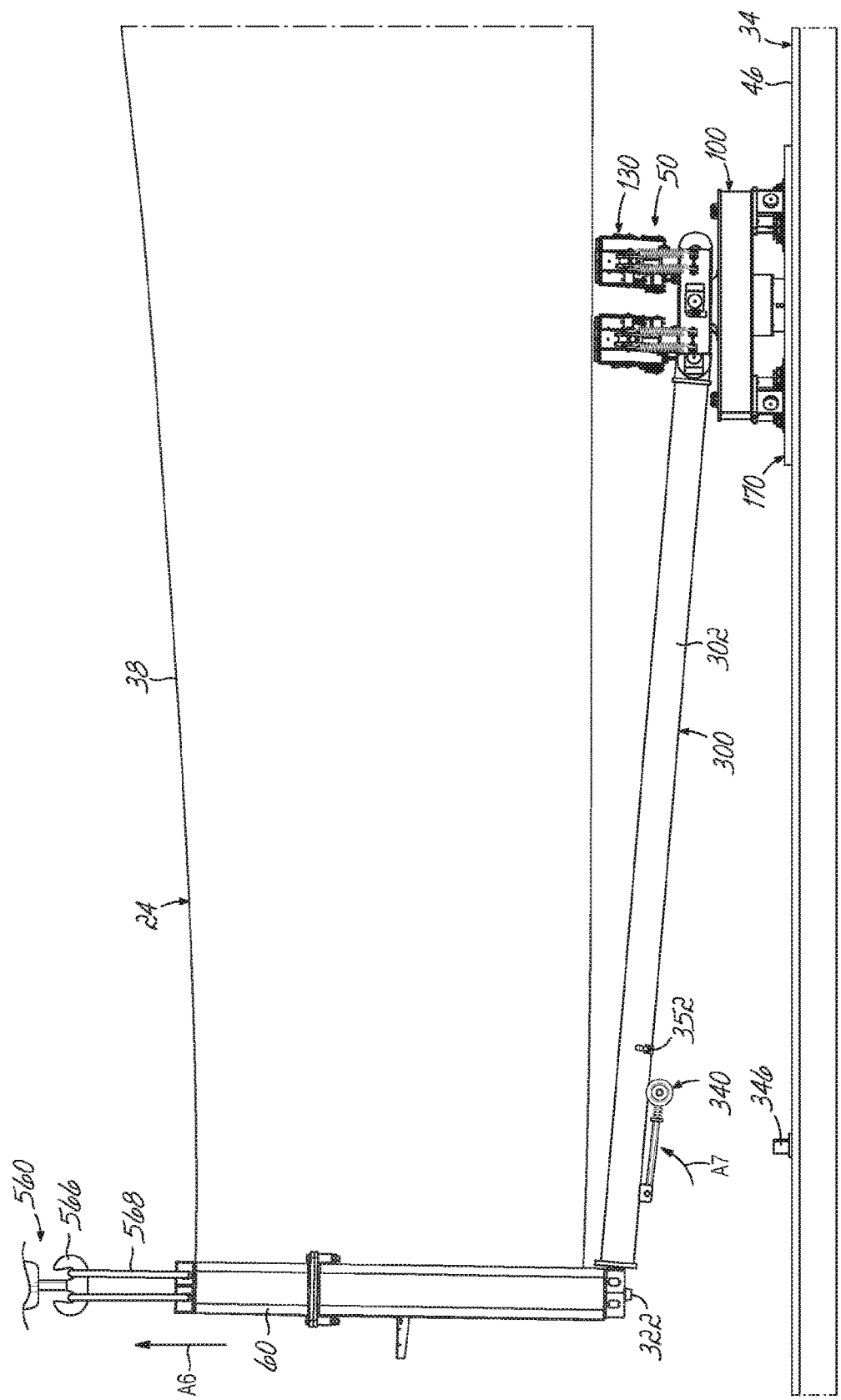
Figure 11F:
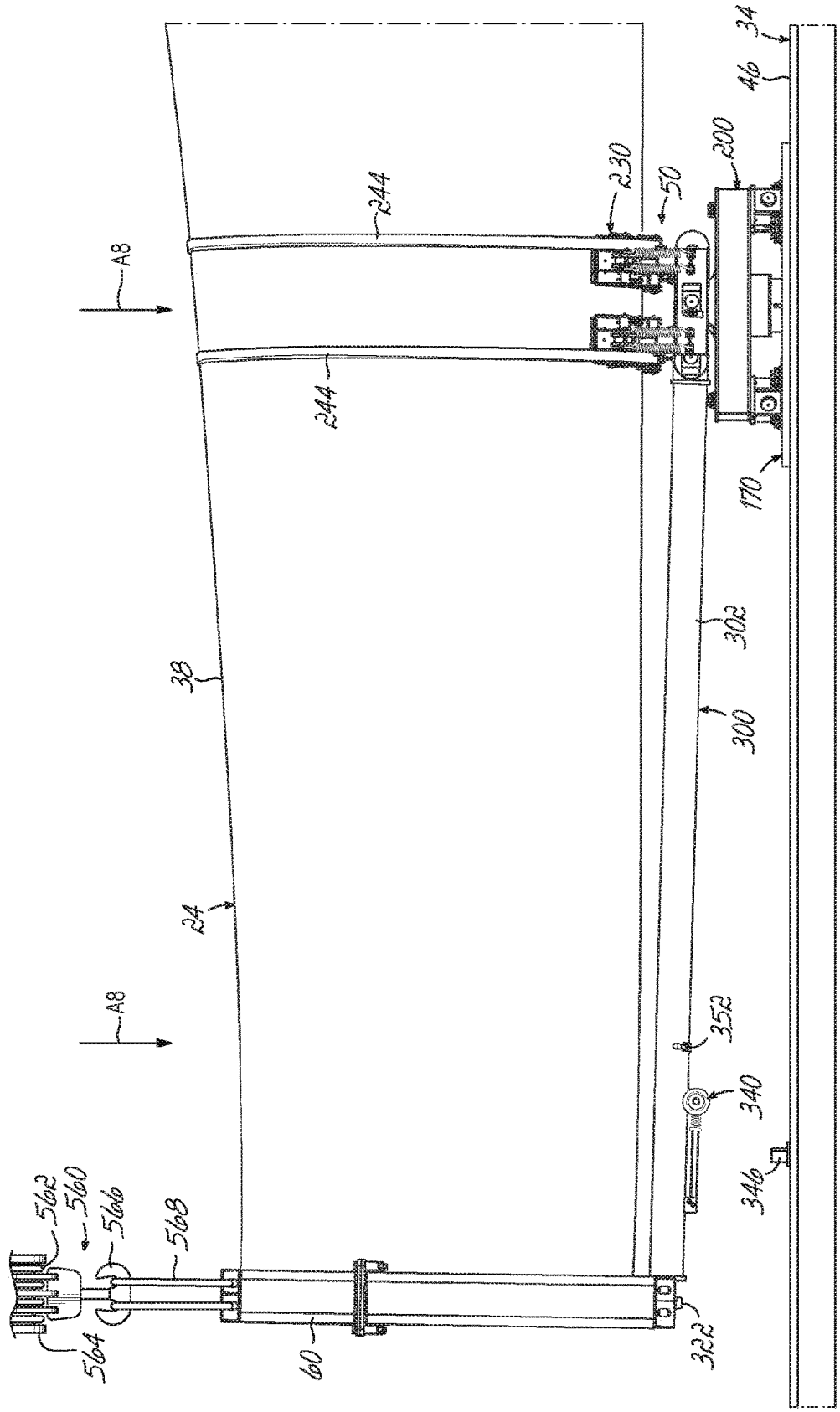

Referring now to FIGS. 11A-11F, a method of loading the blade 24 onto the root bolster 50 is provided. Initially, the rigid arm 300 of the root bolster 50 may be resting on or near the bed 46 of the trailer 34 in the stowed position, and the articulating leg 340 may be in the retracted position. A first lifting arrangement 550 including a hoist rope 552, a hook 554, and a sling 556 may be operatively attached to the body 302 of the rigid arm 300, and the rigid arm 300 may thereby be lifted upwardly and rotated about the second horizontal axis H2, for example, from the stowed position to a deployed position, as indicated by the arrow A2 in FIG. 11A. After the rigid arm 300 has been lifted away from the stowed position, the locking mechanism for the articulating leg 340 may be disengaged, such as by moving the lever 352 to the "off" position, and the articulating leg 340 may be rotated about the third horizontal axis H3 from the retracted position toward an extended position, as indicated by the arrow A3 in FIG. 11B. The distal end 306 of the rigid arm 300 may then be lowered downwardly toward the bed 46 of the trailer 34 by the first lifting arrangement 550, as indicated by the arrow A4 in FIG. 11C, to allow the wheels 344 of the articulating leg 340 to rest on the bed 46 of the trailer 34. The first lifting arrangement 550 may then be removed from the rigid arm 300. As shown in FIG. 11C, the wheels 344 of the articulating leg 340 may be rolled into abutment with the barrier 346 on the bed 46 of the trailer 34 on a side of the barrier 346 opposite from the root fixture 170 to temporarily secure the rigid arm 300 in the illustrated deployed position.

With the rigid arm 300 secured in place, the blade 24 may be lifted above and longitudinally aligned with the root bolster 50 with the leading edge 146 of the blade 24 facing downwardly by at least one second lifting arrangement 560 including a hoist rope 562, a sheave 564, a double hook 566, and a lifting cable 568 operatively attached to the root frame 56, as shown in FIG. 11D. While not shown, a third lifting arrangement may be operatively attached to the tip frame 58, such as for coordinated lifting of the entire blade 24. The blade 24 may then be advanced generally horizontally by the second lifting arrangement 560 to facilitate rigidly coupling the root frame 56 of the blade 24 to the distal end 306 of the rigid arm 300, such as via the distal eyelet 312 and locking pin 322, as indicated by the arrow A5 in FIG. 11D. With the root frame 56 rigidly coupled to the distal end 306 of the rigid arm 300, thereby providing a linkage between the root end 38 of the blade 24 and the upper cradle 230 of the root bolster 50, the root end 38 of the blade 24 may be lifted slightly upwardly, as indicated by the arrow A6 in FIG. 11E, to allow the articulating leg 340 to be rotated over the barrier 346 and returned to the retracted position, as indicated by the arrow A7 in FIG. 11E. In one embodiment, the locking mechanism for the articulating leg 340 may be re-engaged, such as by moving the lever 352 to the "on" position, to secure the articulating leg 340 in the retracted position. The root end 38 of the blade 24 may then be lowered downwardly toward the bed 46 of the trailer 34, as indicated by the arrows A8 in FIG. 11F, to allow the portions of the pressure side 50 and suction side 52 at or near the leading edge 146 of the blade 24 to rest on the saddles 238 of the root bolster 50 at a position inboard of the root end 38 by approximately the same length as the length of the rigid arm 300. In one embodiment, the angle plate 270 may be secured in place prior to such lowering of the blade 24 in order to selectively fix a desired orientation of the upper cradle 230 relative to the lower turntable 200 about the first horizontal axis H1 for accommodating a particular shape or configuration of the blade 24. As described above, the saddles 238 may automatically adjust under the weight of the blade 24 to conform to the exterior surface thereof. The webbing straps or cordlash 244 may then be circumferentially wrapped around the blade 24 and at least a portion of the upper cradle 230 and/or lower turntable 200, such as the saddles 238 of the upper cradle 230.

With the blade 24 loaded onto the root bolster 50 as described above, the second lifting arrangement 560 may be selectively detached from the root frame 56. During subsequent transportation of the blade 24 via the transportation arrangement, longitudinal acceleration and/or deceleration forces are transmitted between the root end 40 of the blade 24 and the root fixture 170 via the rigid arm 300, while the saddles 238 primarily vertically support the blade 24 and the webbing straps or cordlash 244 primarily counteract any vertical acceleration forces acting on the blade 24. The entire blade 24, including the root end 38 thereof, rotates about the first vertical axis V1 along with the upper cradle 230, lower turntable 200, and rigid arm 300 of the root bolster 30 while rounding a curved section of the roadway thereby allowing the root end 38 of the blade 24 to swing out over and beyond the edge of the trailer 34 to efficiently utilize the available side clearances along the roadway. After the transportation arrangement has reached the desired destination, the webbing straps or cordlash 244 may be unwrapped and the root frame 56 may be uncoupled from the rigid arm 300 of the root bolster 50 for removal of the blade 24 from the root bolster 50.

Figure 12A:
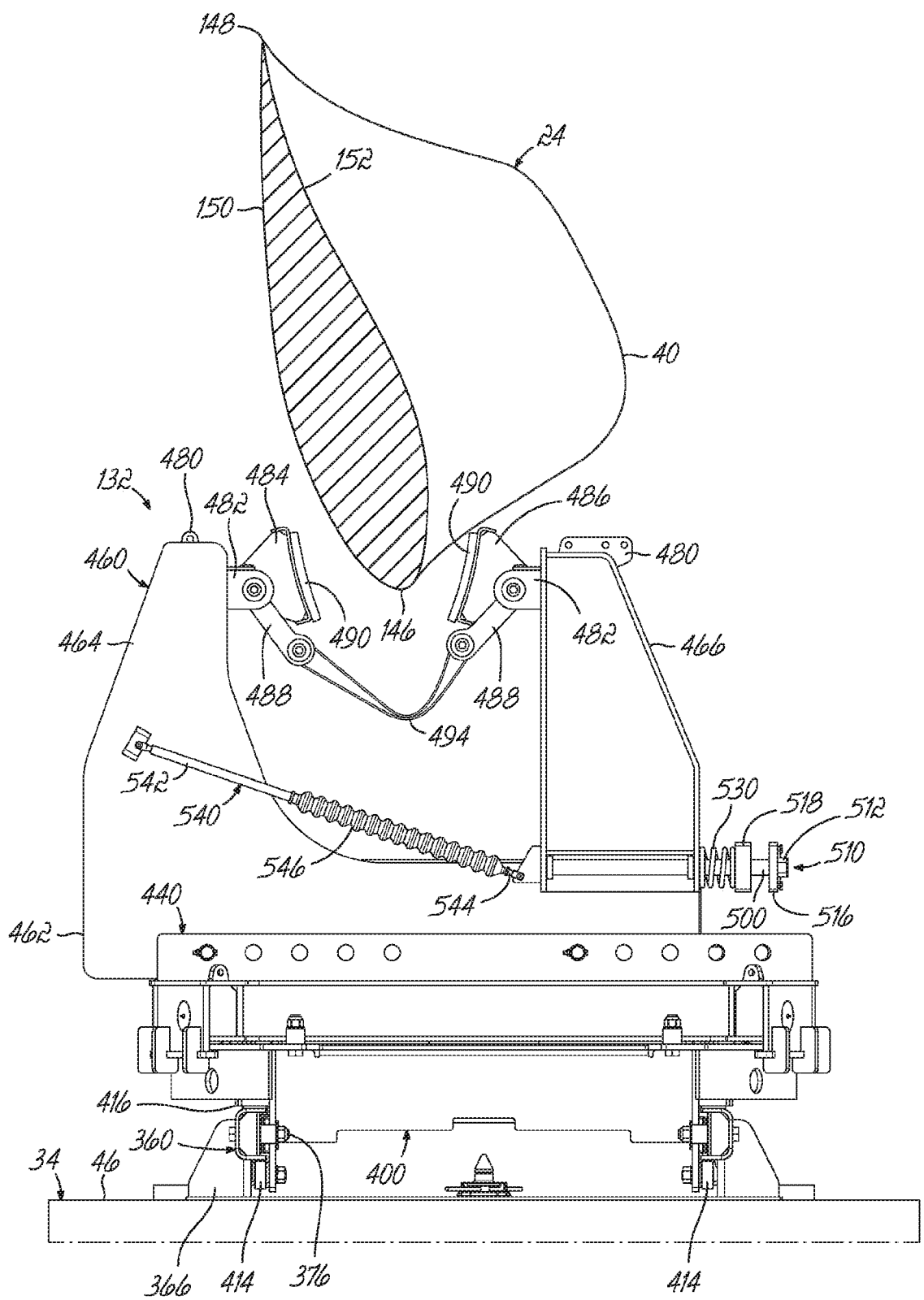
FIGS. 12A-12E are front elevation views of the tip bolster illustrating a method of loading the wind turbine blade onto the tip bolster.
Figure 12B:
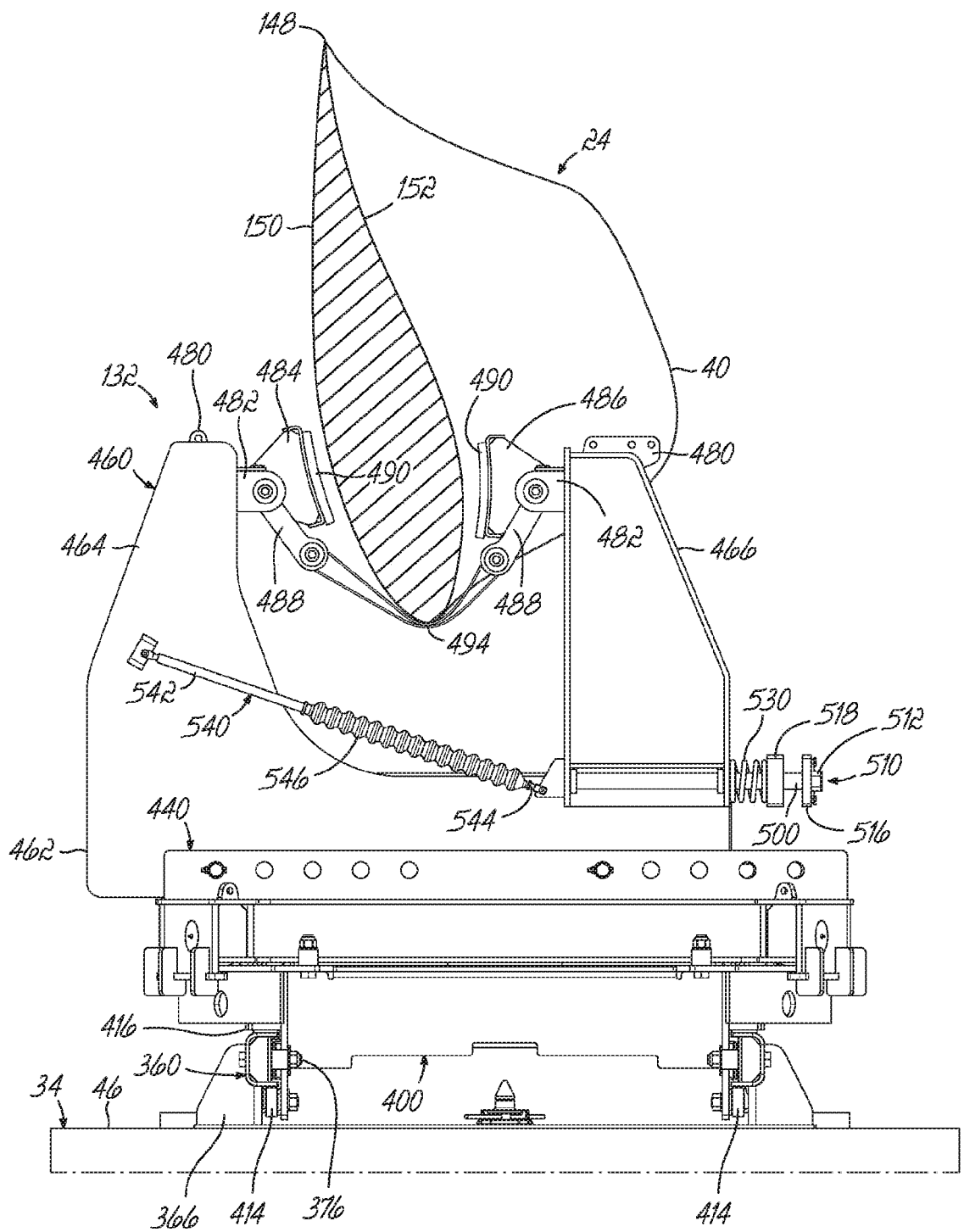
Figure 12C:
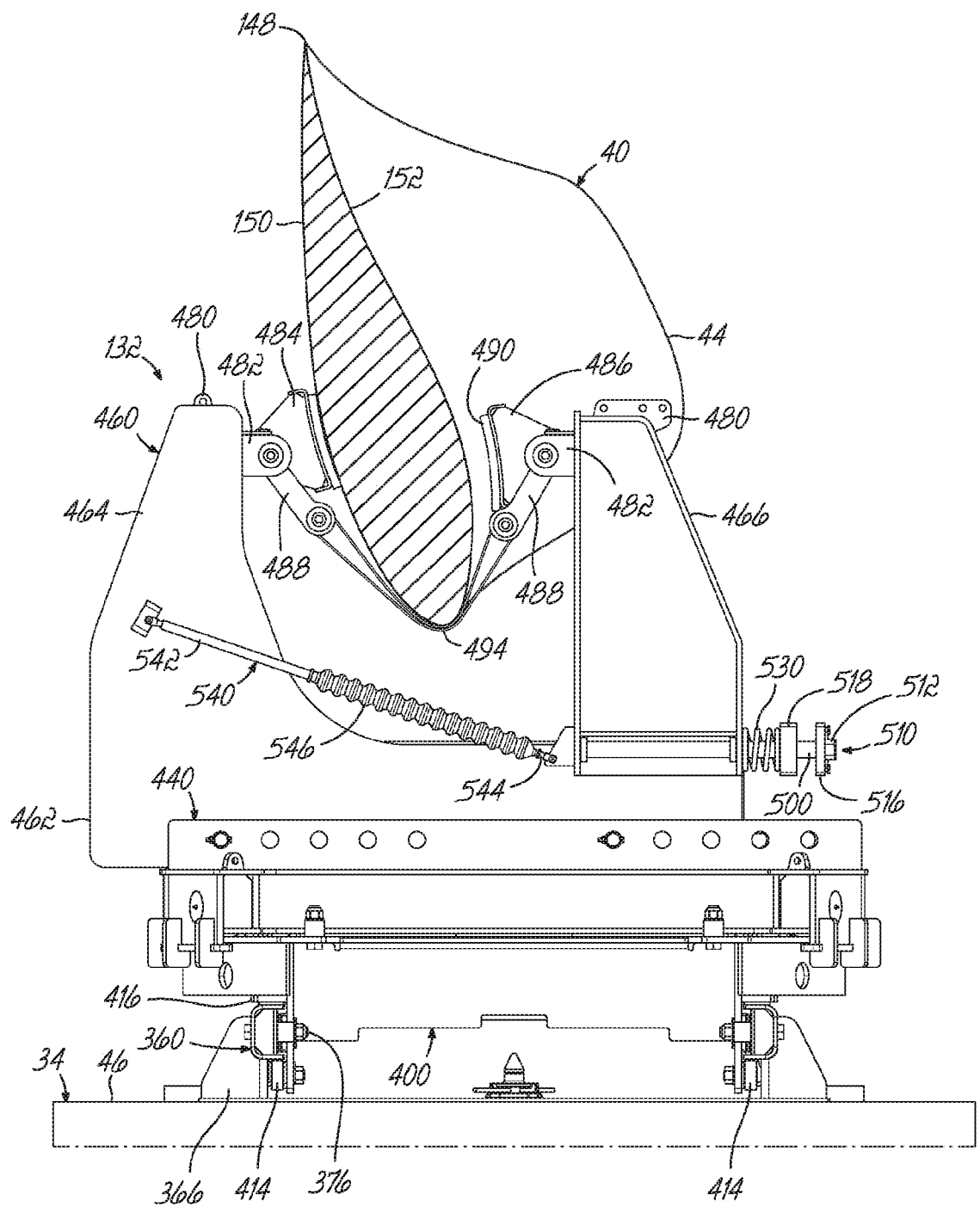
Figure 12D:
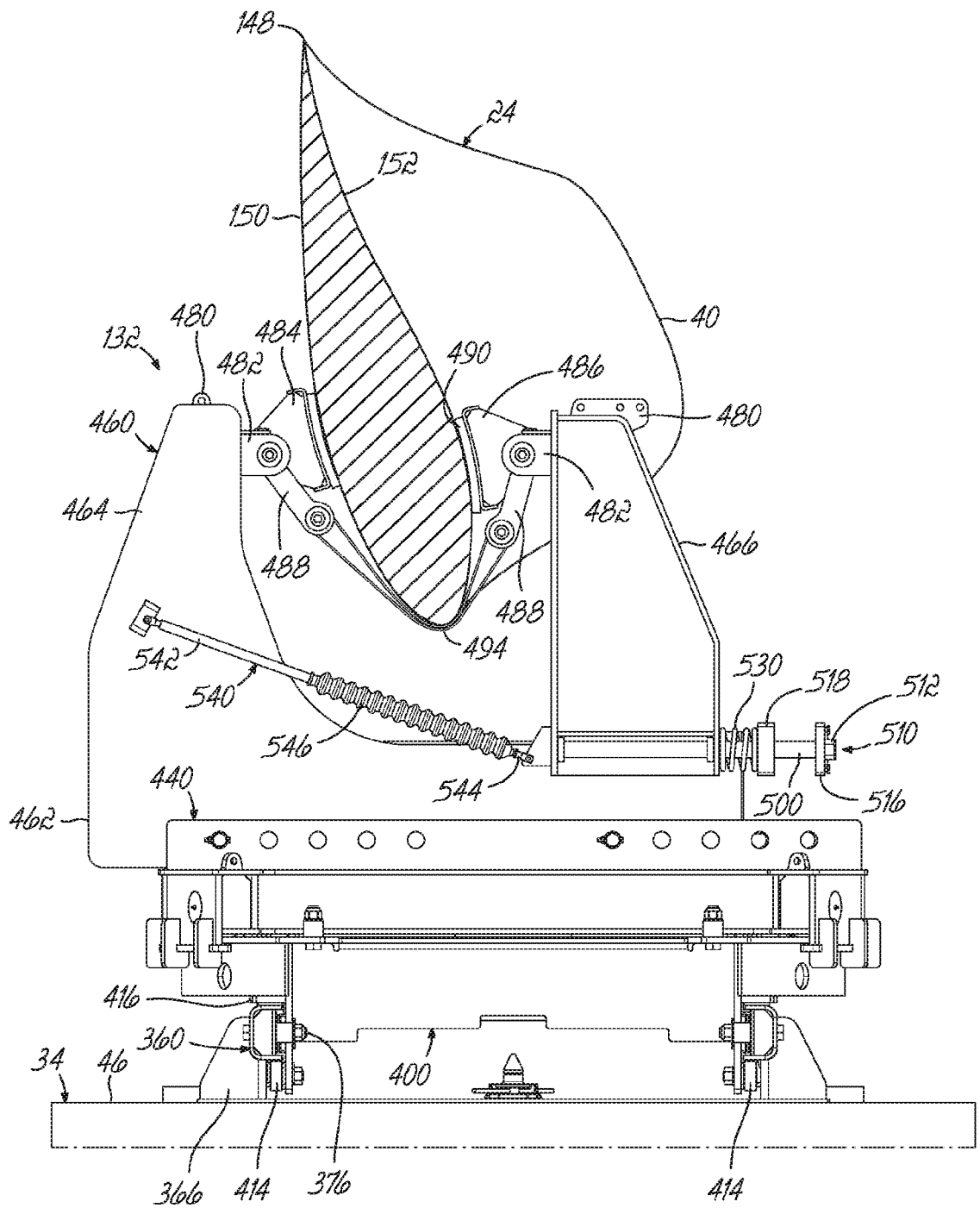
Figure 12E:
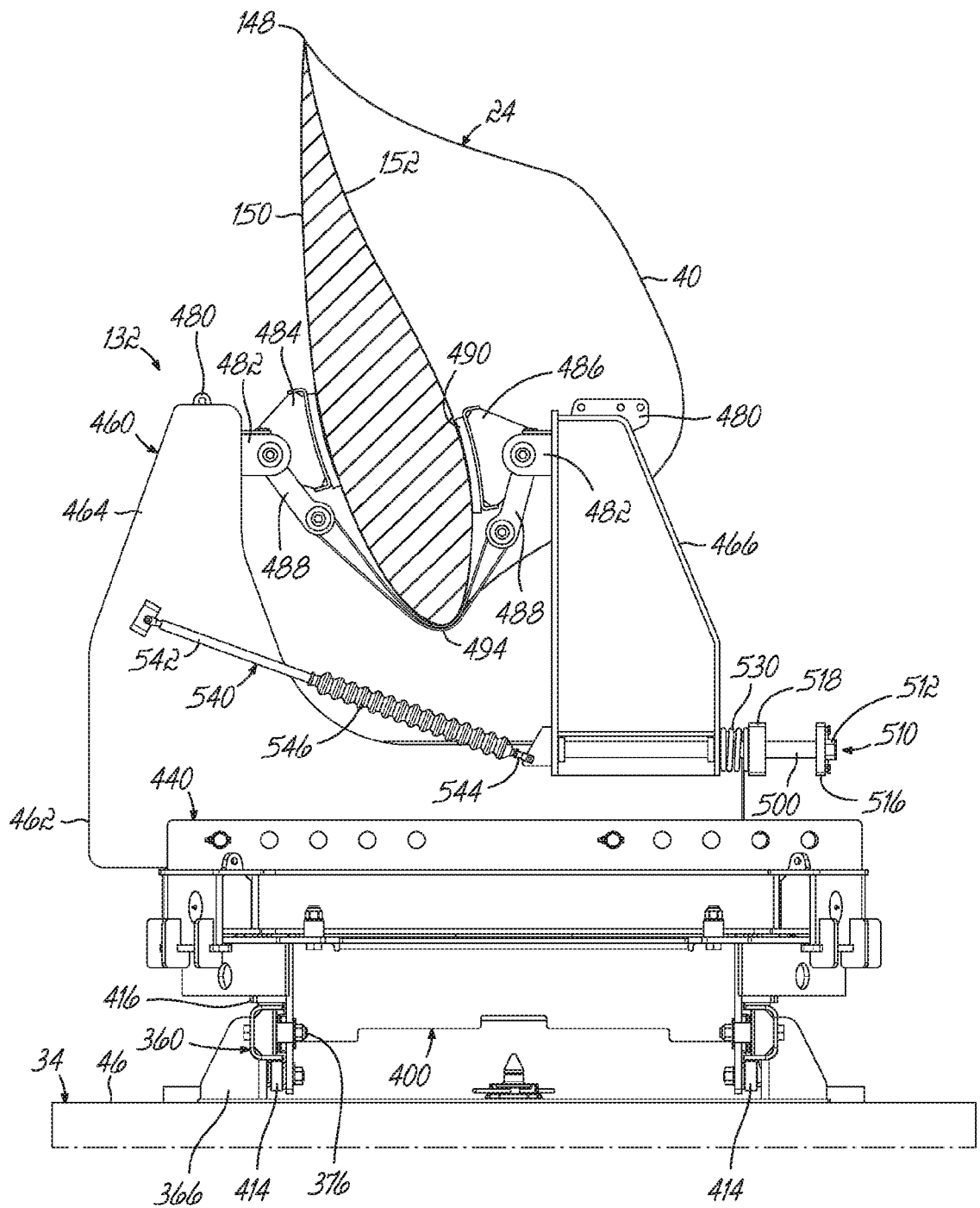
Figure 13A:
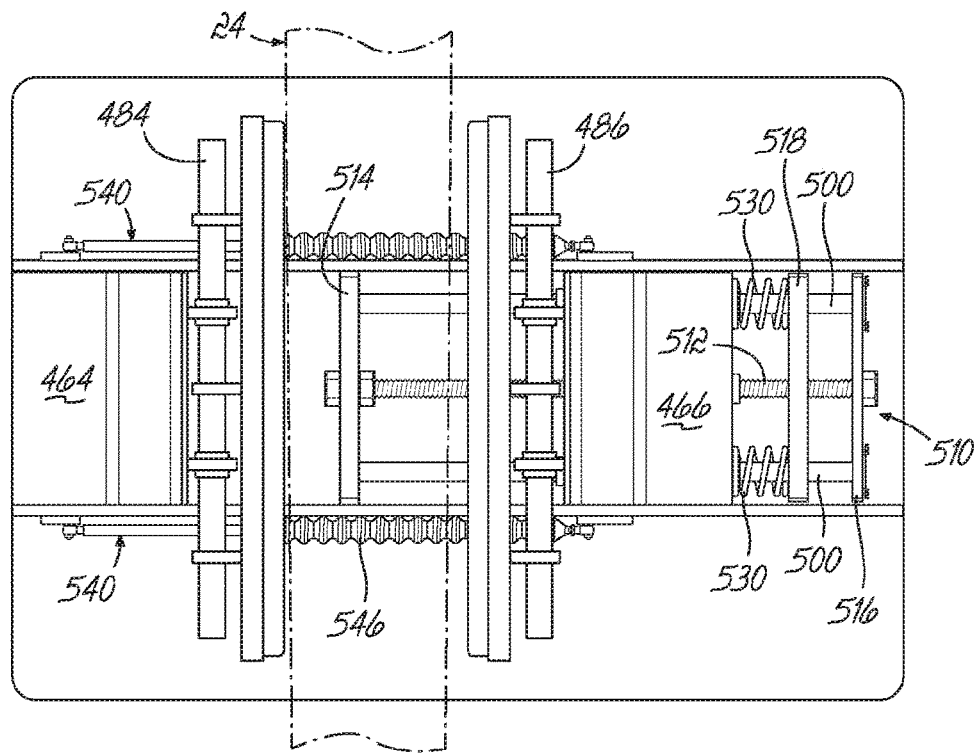
FIGS. 13A-13C are top elevation views of the tip bolster illustrating a method of loading the wind turbine blade onto the tip bolster.
Figure 13B:
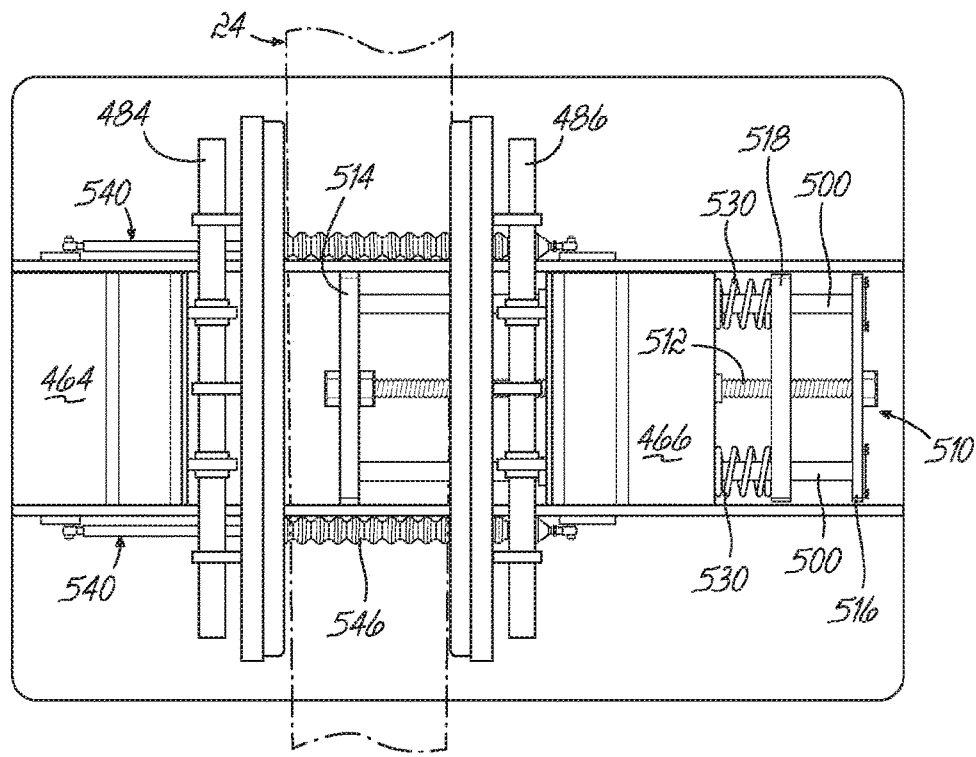
Figure 13C:
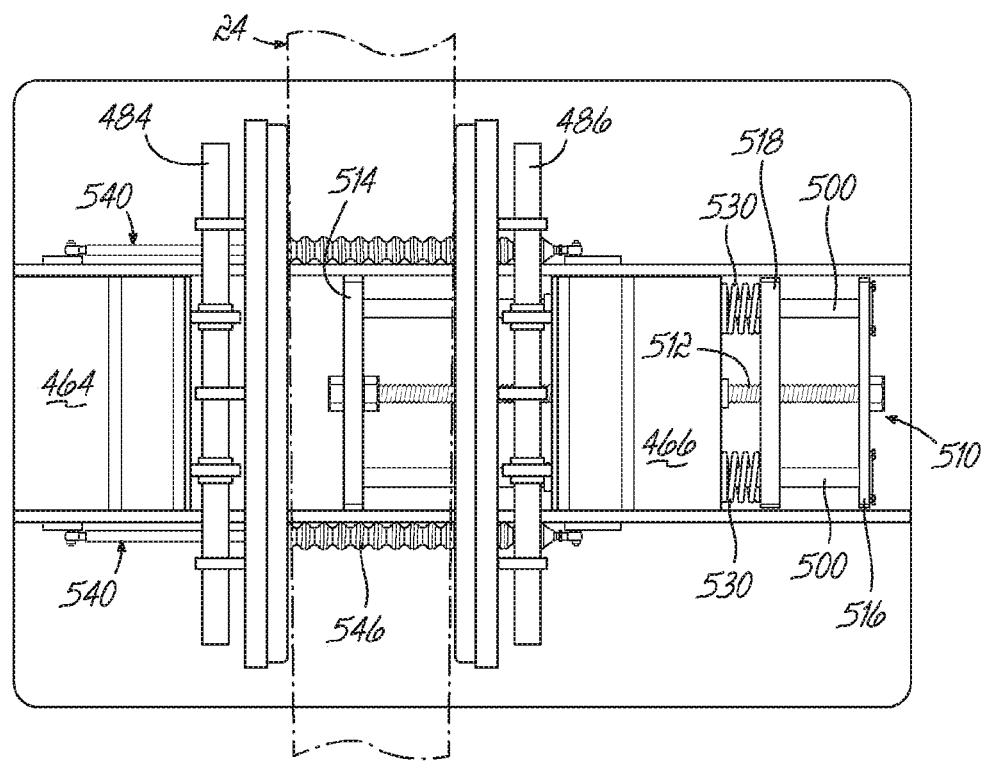

Referring now to FIGS. 12A-12E and 13A-13O, a method of loading the blade 24 onto the tip bolster 52 is provided. Initially, the second clamp arm 466 is spaced sufficiently far apart from the first clamp arm 464 to allow passage of the tip region 29 of the blade 24 between the jaws 484, 486, as shown in FIG. 12A. The tip region 29 of the blade 24 is then lowered toward the bed 46 of the trailer 34 with the leading edge 146 of the blade 24 facing downwardly to allow the leading edge 146 of the blade 24 to contact the pliable saddle 494, as shown in FIG. 12B, such as via a third lifting arrangement (not shown) operatively attached to the tip frame 58. In one embodiment, such lowering of the tip region 29 of the blade 24 may be performed concurrently with the lowering of the root end 38 of the blade 24 described above with respect to FIG. 11F. In any event, as the weight of the blade 24 is transferred to the pliable saddle 494, the blade 24 may rotate slightly about the longitudinal axis of the blade 24 to lean against the stationary jaw 484, and the pliable saddle 494 may tilt at least the movable jaw 486 toward the exterior surface of the blade 24, as shown in FIGS. 12C and 13A. The second clamp arm 466 may then be urged forward along the guide rods 500 to move the movable jaw 486 into contact with the blade 24 to press the blade 24 against the stationary jaw 484 for generating a desired clamping force and/or clamping pressure, such as by operation of the actuator 510 including the drive screw 512, drive plate 518, and springs 530, as shown in FIGS. 12D and 13B. As described above, the jaws 484, 486 and/or saddle 494 may automatically adjust under the weight of the blade 24 to conform to the exterior surface thereof. The drive plate 518 may continue to move forward along the guide rods 500 after the desired clamping force and/or clamping pressure has been generated to thereby compress or pre-load the springs 530, as shown in FIGS. 12E and 13C. After a desired amount of compression or pre-loading of the springs 530 has been achieved, which may be indicated by the drive plate 518 reaching a particular location along the guide rods 500, movement of the drive plate 518 may be halted and the drive plate 518 may be selectively fixed at the particular location along the guide rods 500 to maintain the desired clamping force and/or clamping pressure on the blade 24.

With the blade 24 loaded onto the tip bolster 52 as described above, the third lifting arrangement may be selectively detached from the tip frame 58. The tip frame 62 may remain coupled to the tip region 29 of the blade 24 or may be decoupled therefrom. During subsequent transportation of the blade 24 via the transportation arrangement, longitudinal acceleration and/or deceleration forces are transmitted between the tip region 29 of the blade 24 and the tip fixture 360 via the upper clamp 460, which may also counteract any vertical acceleration forces acting on the blade 24, and the springs 530 may counteract any longitudinal creeping or slipping of the blade 24 to maintain a substantially continuous clamping force and/or clamping pressure thereon, while the saddle 494 primarily vertically supports the blade 24. The entire blade 24, including the tip end 40 thereof, rotates about the second vertical axis V2 along with the upper clamp 460 and intermediate turntable 440 of the tip bolster 52 while rounding a curved section of the roadway thereby allowing the tip end 44 of the blade 24 to swing out over and beyond the edge of the trailer 34 to efficiently utilize the available side clearances along the roadway. During such rotation, the blade 24 may also translate along the rails 362 together with the upper clamp 460, intermediate turntable 440, and lower carriage 400 of the tip bolster 52 to accommodate any resulting changes in the profile of the transportation arrangement. After the transportation arrangement has reached the desired destination, the drive plate 518 may be moved backward along the guide rods 500 and the spring-loaded separators 540 may urge the second clamp arm 436 backward to release the blade 24 from the jaws 484, 486 for removal of the blade 24 from the tip bolster 52.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

The invention claimed is:

1. A transportation arrangement, comprising:
a truck;
a trailer coupled with the truck for being towed behind the truck, the trailer including a bed portion spaced rearwardly of the truck and including opposing sides;
a root bolster positioned on and pivotable relative to the trailer about a first vertical axis;
a separate dolly vehicle;
a tip bolster positioned on and pivotable relative to the separate dolly vehicle about a second vertical axis;
a blade extending between a root end and a tip end, wherein:
a root region of the blade proximate the root end is supported on the bed portion of the trailer by the root bolster such that the first vertical axis is spaced apart from the root end of the blade,
a tip region of the blade proximate the tip end is supported on the separate dolly vehicle by the tip bolster such that the second vertical axis is spaced apart from the tip end of the blade, and
the root bolster further includes a rigid arm extending away from the root bolster near the first vertical axis and having an end fixedly coupled to the blade near the root end of the blade and spaced a distance away from the root bolster along the length of the blade for transmitting longitudinal acceleration forces from the transport arrangement to the blade,
wherein the blade couples the dolly vehicle with the truck and trailer for forming the transportation arrangement, and
wherein at least a portion of the root region is configured to extend laterally away from a side of the trailer when the trailer and separate dolly vehicle are longitudinally offset from each other.

2. The transportation arrangement of claim 1, wherein at least a portion of the tip region is configured to extend laterally away from a side of the separate dolly vehicle when the trailer and separate dolly vehicle are longitudinally offset from each other.

3. The transportation arrangement of claim 1, wherein the blade includes a middle region between the first and second vertical axes, wherein the middle region is configured to span between trailer and separate dolly vehicle when the trailer and separate dolly vehicle are longitudinally aligned with each other, and wherein at least a portion of the middle region is configured to extend laterally away from a side of each of the trailer and separate dolly vehicle when the trailer and separate dolly vehicle are longitudinally offset from each other.

4. The transportation arrangement of claim 1, wherein the root region is configured to overlie the trailer and the tip region is configured to overlie the separate dolly vehicle when the trailer and separate dolly vehicle are longitudinally aligned with each other.

5. The transportation arrangement of claim 1, wherein the root end and the tip end are spaced apart from each other by a length, and wherein the first vertical axis is spaced apart from the root end by a distance equal to approximately one-tenth of the length.

6. The transportation arrangement of claim 1, wherein the first vertical axis is spaced apart from the root end by between approximately 6 m and approximately 12 m.

7. A method of transporting a wind turbine blade on a roadway, comprising:
supporting a root region of the blade using a root bolster positioned on and pivotable relative to a trailer being towed by a vehicle about a first vertical axis, the first vertical axis being spaced apart from a root end of the blade;
fixedly coupling an end of a rigid arm, that extends away from the root bolster near the first vertical axis, to the blade near the root end of the blade for transmitting longitudinal acceleration forces from the vehicle and trailer to the blade;
supporting a tip region of the blade using a tip bolster positioned on and pivotable relative to a separate dolly vehicle about a second vertical axis, the second vertical axis being spaced apart from a tip end of the blade;
transporting the vehicle and trailer along a roadway in longitudinal alignment with the separate dolly vehicle with the blade spanning between the trailer and separate dolly vehicle; and
transporting the vehicle and trailer along a curved section of a roadway such that the trailer and separate dolly vehicle are longitudinally offset from each other and causing at least a portion of the root region to extend laterally away from a side of the trailer.

8. The method of claim 7, wherein transporting the vehicle and trailer along a curved section of a roadway such that the trailer and separate dolly vehicle are longitudinally offset from each other causes at least a portion of a tip region to extend laterally from a side of the separate dolly vehicle when the trailer and separate dolly vehicle are longitudinally offset from each other.

9. The method of claim 7, wherein the blade includes a middle region between the first and second vertical axes, wherein the middle region is configured to span between the trailer and separate dolly vehicle when the trailer and separate dolly vehicle are longitudinally aligned with each other; and further comprising transporting the vehicle and trailer along a curved section of a roadway such that the trailer and separate dolly vehicle are longitudinally offset from each other and causing the middle region to extend laterally away from the a side of each of the trailer and separate dolly vehicle when the trailer and separate dolly vehicle are longitudinally offset from each other.

10. The method of claim 7, wherein transporting the vehicle and trailer along a roadway in longitudinal alignment with the separate dolly vehicle further includes positioning the root region to overlie the trailer and positioning the tip region to overlie the separate dolly vehicle when the trailer and separate dolly vehicle are longitudinally aligned with each other.

11. The method of claim 7, wherein the root end and the tip end are spaced apart from each other by a length, and wherein the first vertical axis is spaced apart from the root end by a distance equal to approximately one-tenth of the length.

12. The method of claim 7, wherein the first vertical axis is spaced apart from the root end by between approximately 6 m and approximately 12 m.

13. A transportation arrangement, comprising:
a truck;
a trailer coupled with the truck for being towed behind the truck, the trailer including a bed portion spaced rearwardly of the truck and including opposing sides;
a root bolster positioned on and pivotable relative to the trailer about a first vertical axis;
a rear trailer coupled with the trailer to be towed behind the truck and trailer;
a tip bolster positioned on and pivotable relative to the rear trailer about a second vertical axis;
a blade extending between a root end and a tip end, wherein:
a root region of the blade proximate the root end is supported on the bed portion of the trailer by the root bolster such that the first vertical axis is spaced apart from the root end, and
a tip region of the blade proximate the tip end is supported on the rear trailer by the tip bolster such that the second vertical axis is spaced apart from the tip end of the blade, and
the root bolster further including a rigid arm extending away from the root bolster near the first vertical axis and having an end fixedly coupled to the blade near the root end of the blade for transmitting longitudinal acceleration forces from the transport arrangement to the blade,
wherein at least a portion of the root region is configured to extend laterally away from a side of the trailer when the trailer and rear trailer are longitudinally offset from each other.

14. The transportation arrangement of claim 13, wherein the root region is configured to overlie the trailer and the tip region is configured to overlie the rear trailer when the trailer and rear trailer are longitudinally aligned with each other.

15. The transportation arrangement of claim 13, wherein the root end and the tip end are spaced apart from each other by a length, and wherein the first vertical axis is spaced apart from the root end by a distance equal to approximately one-tenth of the length.

16. A transportation arrangement, comprising:
a truck;
a trailer coupled with the truck for being towed behind the truck, the trailer including a bed portion spaced rearwardly of the truck and including opposing sides;
a root bolster positioned on and pivotable relative to the trailer about a first vertical axis;
a separate dolly vehicle;
a tip bolster positioned on and pivotable relative to the separate dolly vehicle about a second vertical axis;
a blade extending between a root end and a tip end, wherein:
a root region of the blade proximate the root end is supported on the bed portion of the trailer by the root bolster such that the first vertical axis is spaced apart from the root end of the blade,
a tip region of the blade proximate the tip end is supported on the separate dolly vehicle by the tip bolster such that the second vertical axis is spaced apart from the tip end of the blade, and
the tip bolster being selectively translatable relative to the separate dolly vehicle in a direction along a length of the blade,
wherein the blade couples the dolly vehicle with the truck and trailer for forming the transportation arrangement, and wherein at least a portion of the root region is configured to extend laterally away from a side of the trailer when the trailer and separate dolly vehicle are longitudinally offset from each other.

17. A transportation arrangement, comprising:
a truck;
a trailer coupled with the truck for being towed behind the truck, the trailer including a bed portion spaced rearwardly of the truck and including opposing sides;
a tip bolster positioned on and pivotable relative to the trailer about a first vertical axis;
a separate dolly vehicle;
a root bolster positioned on and pivotable relative to the separate dolly vehicle about a second vertical axis;
a blade extending between a root end and a tip end, wherein:
   a tip region of the blade proximate the tip end is supported on the bed portion of the trailer by the tip bolster such that the first vertical axis is spaced apart from the tip end of the blade,
   a root region of the blade proximate the root end is supported on the separate dolly vehicle by the root bolster such that the second vertical axis is spaced apart from the root end of the blade, and
wherein the blade couples the dolly vehicle with the truck and trailer for forming the transportation arrangement, and
wherein at least a portion of the tip region is configured to extend laterally away from a side of the trailer when the trailer and separate dolly vehicle are longitudinally offset from each other.

* * * * *